US009936363B2

(12) United States Patent
Diamond et al.

(10) Patent No.: US 9,936,363 B2
(45) Date of Patent: Apr. 3, 2018

(54) MULTI-STANDARD IN BUILDING MOBILE RADIO ACCESS NETWORK

(71) Applicant: Key2Mobile LLC, Thousand Oaks, CA (US)

(72) Inventors: Patrick Diamond, Wilmington, MA (US); Anthony Giraudo, Thousand Oaks, CA (US); John Shay, Seattle, WA (US)

(73) Assignee: Key2Mobile LLC, Thousand Oaks, CA (US)

( * ) Notice: Subject to any disclaimer, the term of this patent is extended or adjusted under 35 U.S.C. 154(b) by 76 days.

(21) Appl. No.: 14/562,657

(22) Filed: Dec. 5, 2014

(65) Prior Publication Data

US 2015/0094014 A1  Apr. 2, 2015

Related U.S. Application Data

(63) Continuation-in-part of application No. 13/866,827, filed on Apr. 19, 2013, now Pat. No. 9,369,171.

(51) Int. Cl.
*H04W 4/22* (2009.01)
*H04W 4/04* (2009.01)
*H04L 12/723* (2013.01)

(52) U.S. Cl.
CPC ............ *H04W 4/22* (2013.01); *H04W 4/043* (2013.01); *H04L 45/50* (2013.01)

(58) Field of Classification Search
None
See application file for complete search history.

(56) References Cited

U.S. PATENT DOCUMENTS

| 6,205,133 | B1 * | 3/2001 | Bexten | H04B 1/0007 370/343 |
| 7,483,411 | B2 * | 1/2009 | Weinstein | H04L 63/08 370/338 |
| 7,536,188 | B1 * | 5/2009 | Fegan | G01S 5/0289 340/10.1 |
| 7,764,700 | B2 * | 7/2010 | Muirhead | H04L 12/4641 370/395.21 |
| 7,949,347 | B1 * | 5/2011 | Copeland | H04M 1/725 455/404.2 |
| 8,165,559 | B1 * | 4/2012 | Klesper | H04W 76/007 379/37 |

(Continued)

*Primary Examiner* — Jeffrey M Rutkowski
*Assistant Examiner* — Jonathan B Wood
(74) *Attorney, Agent, or Firm* — Fitzsimmons IP Law

(57) ABSTRACT

A multi-standard indoor mobile radio access network having a centralized device is provided. In one embodiment of the present invention, a centralized device is configured to transmit a wake-up signal to a wireless device once the wireless device has entered a service area, wherein the wake-up signal triggers the downloading and/or opening of an application on the wireless device configured to determine whether a 911 call has been made. If a 911 call has been made, the application transmits a notification signal to the centralized device. In response thereto, the centralized device transmit location information of the wireless device to an emergency responder. The centralized device also transmits a "ping" to the wireless device during predetermined periods of time in order to keep the application open and/or installed on the wireless device.

30 Claims, 13 Drawing Sheets

(56) References Cited

U.S. PATENT DOCUMENTS

| | | | | |
|---|---|---|---|---|
| 8,538,375 B2* | 9/2013 | Franz | H04W 4/14 | 455/404.2 |
| 8,824,479 B2* | 9/2014 | Stille | 370/395.2 | |
| 8,890,685 B1* | 11/2014 | Sookman | H04W 4/22 | 340/539.13 |
| 8,990,043 B1* | 3/2015 | Kolodziej | G01C 5/06 | 455/404.2 |
| 9,071,807 B2* | 6/2015 | Billau | H04N 7/18 | |
| 9,121,931 B2* | 9/2015 | Xu | G01S 11/06 | |
| 9,253,081 B2* | 2/2016 | Anpat | H04W 4/005 | |
| 9,282,187 B1* | 3/2016 | Martino | H04M 3/5116 | |
| 9,319,944 B2* | 4/2016 | Helbert | H04W 36/0022 | |
| 9,332,412 B2* | 5/2016 | Salkini | H04W 4/22 | |
| 9,414,239 B2* | 8/2016 | Brunk | H04W 24/00 | |
| 9,672,727 B1* | 6/2017 | Alexander | G08B 25/016 | |
| 2007/0230453 A1* | 10/2007 | Giaretta | H04L 63/08 | 370/389 |
| 2007/0232259 A1* | 10/2007 | Shiga | H04M 11/04 | 455/404.1 |
| 2008/0039048 A1* | 2/2008 | Turri | H04W 4/22 | 455/404.1 |
| 2009/0163224 A1* | 6/2009 | Dean | G01S 5/0226 | 455/456.1 |
| 2009/0274202 A1* | 11/2009 | Hanke | H04W 88/06 | 375/220 |
| 2010/0062741 A1* | 3/2010 | Lee | H04M 1/72552 | 455/404.1 |
| 2010/0093359 A1* | 4/2010 | Gallagher | H04W 16/32 | 455/445 |
| 2010/0330952 A1* | 12/2010 | Yeoman | H04M 1/72541 | 455/404.2 |
| 2011/0028161 A1* | 2/2011 | Larsen | G01S 5/0226 | 455/456.1 |
| 2011/0038337 A1* | 2/2011 | Gallagher | H04W 60/04 | 370/329 |
| 2011/0207476 A1* | 8/2011 | Qahwash | B60R 25/00 | 455/456.2 |
| 2011/0212699 A1* | 9/2011 | Howard | H04M 1/7253 | 455/404.1 |
| 2011/0244824 A1* | 10/2011 | Hursey | H04M 3/42195 | 455/404.1 |
| 2012/0064855 A1* | 3/2012 | Mendelson | G01C 21/206 | 455/404.2 |
| 2012/0178404 A1* | 7/2012 | Chin | H04W 4/22 | 455/404.1 |
| 2012/0190380 A1* | 7/2012 | Dupray | G01S 1/026 | 455/456.1 |
| 2012/0329420 A1* | 12/2012 | Zotti | H04M 1/72541 | 455/404.2 |
| 2013/0040600 A1* | 2/2013 | Reitnour | G01S 19/17 | 455/404.2 |
| 2013/0045759 A1* | 2/2013 | Smith | H04W 64/00 | 455/456.6 |
| 2013/0109410 A1* | 5/2013 | Meyerhofer | H04L 67/22 | 455/456.3 |
| 2013/0141233 A1* | 6/2013 | Jacobs | G08B 19/00 | 340/521 |
| 2013/0217332 A1* | 8/2013 | Altman | H04H 60/90 | 455/41.2 |
| 2013/0316728 A1* | 11/2013 | Bradley | H04W 24/00 | 455/456.1 |
| 2013/0322214 A1* | 12/2013 | Neukirch | G01S 5/20 | 367/118 |
| 2013/0329047 A1* | 12/2013 | Jankowski | G08B 25/08 | 348/158 |
| 2013/0337767 A1* | 12/2013 | Siomina | G01S 5/0009 | 455/404.2 |
| 2013/0337802 A1* | 12/2013 | Morken | H04W 76/02 | 455/426.1 |
| 2014/0094210 A1* | 4/2014 | Gellens | H04W 4/12 | 455/517 |
| 2014/0155095 A1* | 6/2014 | Albanes | H04W 4/22 | 455/456.3 |
| 2014/0162693 A1* | 6/2014 | Wachter | H04W 4/021 | 455/456.3 |
| 2014/0198719 A1* | 7/2014 | Vanderveen | H04L 67/16 | 370/328 |
| 2014/0199959 A1* | 7/2014 | Hassan | G01S 5/0205 | 455/404.2 |
| 2014/0253324 A1* | 9/2014 | Tamez | A61B 5/1135 | 340/539.12 |
| 2014/0274116 A1* | 9/2014 | Xu | G01S 11/06 | 455/456.1 |
| 2014/0274150 A1* | 9/2014 | Marti | H04W 4/021 | 455/456.3 |
| 2014/0313984 A1* | 10/2014 | Diamond | H04B 1/40 | 370/329 |
| 2014/0344913 A1* | 11/2014 | Stahl | H04L 12/1403 | 726/11 |
| 2014/0370837 A1* | 12/2014 | Gladstone | H04W 4/008 | 455/404.1 |
| 2015/0016305 A1* | 1/2015 | Douer | H04W 48/16 | 370/254 |
| 2015/0065082 A1* | 3/2015 | Sehgal | H04W 4/22 | 455/404.2 |
| 2015/0097669 A1* | 4/2015 | Li | G08B 5/222 | 340/539.13 |
| 2015/0111525 A1* | 4/2015 | Crockett | H04W 4/22 | 455/404.2 |
| 2015/0256972 A1* | 9/2015 | Markhovsky | H04W 4/023 | 455/456.1 |
| 2015/0358796 A1* | 12/2015 | Sarna, II | H04W 4/22 | 455/404.2 |
| 2016/0093212 A1* | 3/2016 | Barfield, Jr. | H04N 7/181 | 348/144 |

* cited by examiner

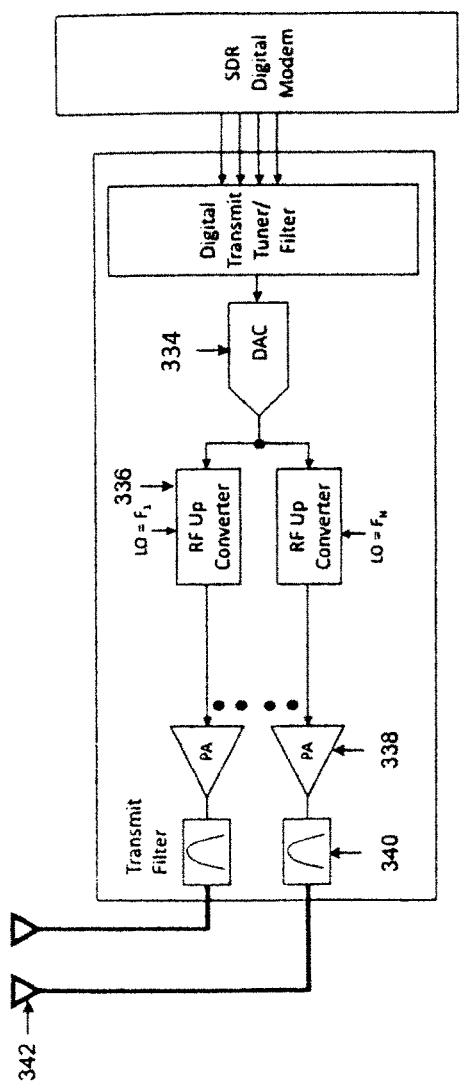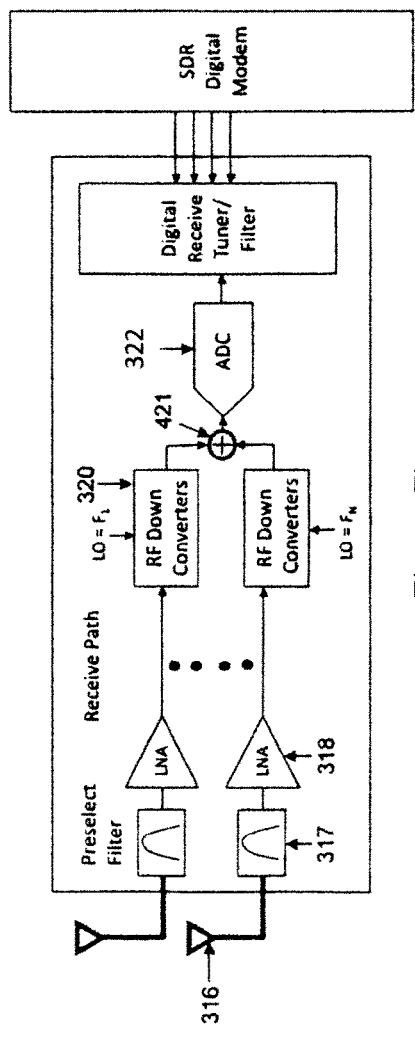
Figure 7a
Figure 7b

MULTI-STANDARD IN BUILDING MOBILE RADIO ACCESS NETWORK

RELATED APPLICATIONS DATA

This application is a continuation-in-part of Ser. No. 13/866,827, which was filed on Apr. 19, 2013, which claims priority pursuant to 35 U.S.C. § 119(e) to U.S. provisional patent application, Ser. No. 61/636,286, filed Apr. 20, 2012, the subject matter of which is incorporated by reference herein in its entirety.

BACKGROUND OF THE INVENTION

1. Field of the Invention

The present invention relates to indoor mobile radio access networks, and more particularly to an indoor mobile radio access network configured to detect a wireless device, communicate with an application operating on the wireless device, and, based on a notification signal received from the application, provide location information to an emergency responder, where the location information includes at least Z-axis location information of the wireless device.

2. Description of Related Art

Mobile services providers use several techniques known in the art to provide licensed spectrum service in areas of dense population and areas with large signal degradation due to the presence of physical structures such as large buildings. These techniques include the use of femtocells, picocells, or Distributed Antenna Systems ("DAS") to extend licensed spectrum networks in these environments. While such techniques can be used to provide basic services, they are not ideal and make it difficult for service providers to comply with various government regulations.

For example, the U.S. Federal Communications Commissions (FCC) has several requirements applicable to wireless telephones. In 1996, the FCC issued an order requiring service providers to determine and transmit location information for 911 calls. The FCC set up a two-phase program, where phase 1 involved sending the location of the receiving antenna for 911 calls, and phase 2 involved sending location information for wireless devices making 911 calls. Service providers were allowed to choose either a handset-based location method (e.g., using a Global Positioning System, or GPS) or a network-based location method (e.g., using triangulation between cell towers). The order set accuracy requirements that required the location information to be within 50 meters for 67% of calls, and within 150 meters for 90% of calls if the handset-based location method was used, and within 100 meters for 67% of calls, and within 300 meters for 90% of calls if the network-based location method was used. And to complicate matters further, in July 2011, the FCC announced a proposed rule requiring that after an eight-year implementation period (i.e., in 2019), service providers will be required to meet even more stringent location accuracy requirements.

While current techniques can be used to provide general location information (e.g., the location of a particular building), they cannot be used to provide detailed location information (e.g., the location of a caller within a particular building), and they certainly cannot be used to provide Z-axis location information (e.g., the floor that the call is on), which can be of particular importance if the caller is within a very tall building, such as the new Freedom Tower in New York, which has over 100 floors.

Thus, not only would it be useful to have a radio access network solution for high population density areas with closely situated large structures that offers improved service to users, removes load from existing macro-networks, requires minimal additional infrastructure to deploy, and does not interfere with the existing macro-network, but it would also be beneficial to have a solution that allows service providers to provide detailed location information (e.g., X, Y and/or Z-axis information) for wireless devices used to make emergency "911" calls. Such a solution could also be used to provide location information to a service provider and/or advertisements to a wireless device based on a request for certain information and/or the performance of other functionalities.

SUMMARY OF THE INVENTION

The present invention provides a multi-standard indoor mobile radio access network by utilizing existing building infrastructure coupled with Ingress/Egress detection, configurable radio heads, radio synchronization technology, interface gateways, and Multiprotocol Label Switching (MPLS) routers to integrate with existing macro-networks. The present invention further includes a configurable application, which operates on a wireless device, is controlled by the mobile radio access network, and functions by monitoring the wireless device and notifying the network when the wireless device is being used to request emergency assistance.

In a first embodiment of the present invention, the core architecture of a mobile radio access network includes a plurality of radio heads, wherein each radio head provides a wideband analog front end to a network. Each radio head also performs base band processing and digitization, and is connected to existing wiring in a building (e.g., Ethernet wiring, etc.). The wiring directly connects between each radio head and an interface gateway. The interface gateway is responsible for directing and receiving communication from each of the service providers. The interface gateway transmits data through an MPLS Router, which has a label based link to each service provider's small cell gateway. After processing the data from each radio head channel by the interface gateway, service provider networks will view the data as if they are communicating with a dense cluster of femtocells. This is possible because the interface gateway aggregates the information from many radio heads, which serve multiple services providers, and directs them to each service provider individually.

The ability to achieve a high number of simultaneous channels in radio heads requires optimization of the amount of transmitted information. This can be achieved, for example, by using customized data packets that can be quickly processed to maximize throughput. The format of these data packets is programmable in both the radio heads and the interface gateway and as a result can be customized for a particular building. For example, each time a radio head sends data to the interface gateway, a header packet may include at least a radio head identification number (e.g., a unique identifier), location information (such as x-axis information (e.g., latitude, etc.), y-axis information (e.g., longitude, etc.), z-axis information (e.g., floor, elevation, altitude, etc.), etc.), the channel used, and a service provider identifier (e.g., the service provider of the wireless device in communication with the radio head). Since there are a finite number of service providers, this information can be encoded using a three-bit or four-bit number rather than an ASCII string or other large data format the provider itself uses as identification. The goal of using such packets is to allow processing of radio head data through efficient use of the available processing power in an interface gateway. The radio head will effectively be able to decode information by looking up associated values in a table or memory location.

In one embodiment of the present invention, each radio head transceiver includes a plurality of preselect filters, wherein each filter is tuned to a particular service or communications standard, a plurality of low noise amplifiers (LNAs), a plurality of RF down-converter, at least one analog-to-digital converter, at least one digital receive tuner/filter and a software defined radio (SDR) digital modem. Each LNA and down-converter can be wide-band, or tuned to a particular band or service. The digital receive tuner/filter can be incorporated into a single/multiple FPGAs, or a single custom ASIC. The modem is software programmable, and it will support multiple cellular services, and is reconfigurable through software. The modem supports existing 3G/4G protocols, and can also be programmed to support future protocols. The modem resultantly can support multiple protocols, multiple simultaneous carriers, and multiple modulation standards.

When the network detects users within the receiver range of the radio head, it then uses frequency and modulation characteristics of a device signal to determine a device's communication protocol. For example, in communications standards where users are allocated a small amount of bandwidth, the transmission frequency is indicative of both the service provider and communications protocol of the signal because each provider has licensed their own spectrum. However, in protocols like Code Division Multiple Access ("CDMA") where a broader spectrum is shared, a different technique such as reading carrier information from the unencrypted header of communicated data containing service provider identification can be used. This information is used to configure an appropriate transmit and receive channel in the SDR software for communication with the device. Because of this adaptability, the radio head acts as a ubiquitous transceiver for different service providers and communications protocols that is transparent to the user. This overcomes a significant disadvantage present in femtocells, picocells, and DAS systems that are provider specific.

Using an ingress and egress detection method the detection process begins as soon as a user enters a building. When the signal from the macro-network begins to attenuate, mobile devices increase their transmission power in order to maintain connection to the network. When this occurs, a sally port receiver detects the connection protocol and service provider of the device. This information is shared with the rest of the radio network, possibly in a table within the interface gateway. The interface gateway can determine whether the radio access network has available channels capable of handling the new user. The network can either reallocate idle resources to the user's protocol or place the user in a queue if none are available. If a channel is available, the appropriate radio heads establish a communication block within the SDR capable of handling the user. The mobile radio access network then communicates with the provider network to negotiate handoff of the user. At the same time the interface gateway coordinates with the radio heads to reallocate resources as needed for other users. Similarly, when a device user is connected to the mobile radio access network and begins exiting from the sally port, the mobile radio access network can begin negotiating handoff of the user back to the macro-network. Protocol detection in combination with the interaction between the interface gateway and the macro-networks allows for a seamless user experience during both ingress and egress.

Once they device user is detected, a user location detection function can be implemented within the radio access network, wherein the radio heads are used to determine mobile device and user location. The received power level from a particular mobile device is measured by a plurality of radio heads (e.g., at least two different radio heads, etc.). Since the absolute transmitted power by the mobile device is unknown, the relative received signal strength at the radio heads are compared and the location of the mobile device can be estimated based on the relative distances from the radio heads. Alternatively, or additionally, a "time of arrival" approach can be used to locate the position of a mobile device. In this layout, radio heads will look for a special signal or signal feature and create a timestamp of the signal feature arrival. Using the travel time of signals traveling through air at approximately 1 ns/ft over a distance between the device and the radio head, the relative position of the device is determined. In order for this method to be accurate, synchronization of the radio head timing is needed. Problems with the synchronization can also be determined by the use of additional radio heads. The position of the radio heads could potentially be programmed during radio head installation for maximum accuracy, but these techniques can also be applied for the radio heads to determine their own relative positions. For example, sensors can monitor the transmission from the radio head(s). This extra capability would allow the location measurements to remain accurate even if the radio heads are moved from the manually entered positions at installation.

These location methods are possible because of the aggregation of radio head data by the interface. A system of independent femtocells would be poorly suited to provide similar functionality because femtocells are designed to communicate directly with the service provider network. The scale of a large mobile network would make implementing this type of functionality remotely unwieldy and expensive because the network would need to know the physical location of each femtocell. Having radio head data that includes location information and including an interface gateway to manage this data reduces the task of device location to an achievable scale.

It should be noted that the location information provided does not only give latitude and longitude coordinates for each mobile device. The radio heads have floor information, allowing a user to be even more precisely located by including information about their altitude. This information is particularly useful when an emergency "911" phone call is made and the caller is unable to convey their exact location. The exact location information could be conveyed directly to emergency responders by remotely accessing the interface gateway data at a building security computer terminal. Also, it would not be difficult for a mobile service to gather the additional altitude or floor information in addition to other location information which would be relayed to emergency responders directly.

In one embodiment of the present invention, in order to determine that an emergency "911" call is being made, an application is installed on a wireless device in communication with the radio access network and is used to determine if the wireless device is making a 911 call. If it is, notification can be provided to the network, allowing the network to notify the emergency responder of the device's location. In accordance with this embodiment, the network (or a device on said network) is configured to recognize when the wireless device has entered a service area (e.g., entered a building). Once the wireless device has been detected, the network may be configured to transmit a wake-up signal to the wireless device. In response thereto, the wireless device may be configured to download and/or activate (or open) an application, wherein the application is configured to detect when an emergency "911" call has being made and to transmit a notification signal in response thereto. If a notification is received by the network, the network may be configured to communication location information (X, Y and/or Z-axis information) for the wireless device to the emergency responder, thereby allowing the emergency responder to more easily locate the individual that made the 911 call within the service area (e.g., within the building).

After a predetermined period of time, the network may also be configured to transmit a "ping" (or another recognizable signal) to the wireless device if the wireless device is still within the service area. If after the predetermined period of time, a "ping" is not received by the wireless device, the application (or code related thereto) may be configured to deactivate (or close) and/or uninstall the application from the wireless device. This allows the application to only remain active and/or on the wireless device when the wireless device is within the service area.

In another embodiment of the present invention, a method for monitoring a wireless device for the transmission of an emergency communication includes receiving a wake-up signal, which preferably happens once the wireless device has entered the service area. In response to the wake-up signal, a monitoring application is downloaded and/or activated (or opened). Once opened, the application functions by monitoring the wireless device for a request for emergency assistance, which may be, for example, a 911 telephone call. If it is determined that a request for emergency assistance has been made, a notification signal is provided to the network (or device in communication therewith). If no request for assistance is made, then it is determined whether a "ping" has been received from the network during a predetermined period of time. If it has, then the application continues to monitor for emergency assistance. If it has not, then the application is closed and/or uninstalled.

In another embodiment of the present invention, a method for providing location information to an emergency responder includes determining whether a wireless device is within a service area. If the wireless device is within the service area, then a wake-up signal is transmitted to the device. The wireless device is then monitored for the transmission of a notification signal. If the notification signal is received from the wireless device, then location information (e.g., X, Y and/or Z-axis information) is sent to an emergency responder. If after a predetermined period of time the wireless device is still within the service area, then a "ping" is transmitted to the wireless device, which keeps the monitoring application active and/or installed while the device is within the service area.

A more complete understanding of a multi-standard indoor mobile radio access network will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 7a and 7b depict transmitter and receiver architectures utilizing frequency shifting;

DETAILED DESCRIPTION OF THE PREFERRED EMBODIMENT

An embodiment of the present invention includes an apparatus and method for providing a multi-standard indoor mobile radio access network by utilizing existing building infrastructure coupled with Ingress/Egress detection, configurable radio heads, radio synchronization technology, interface gateways, and Multiprotocol Label Switching ("MPLS") to integrate with existing macro-networks.

Figure 1:
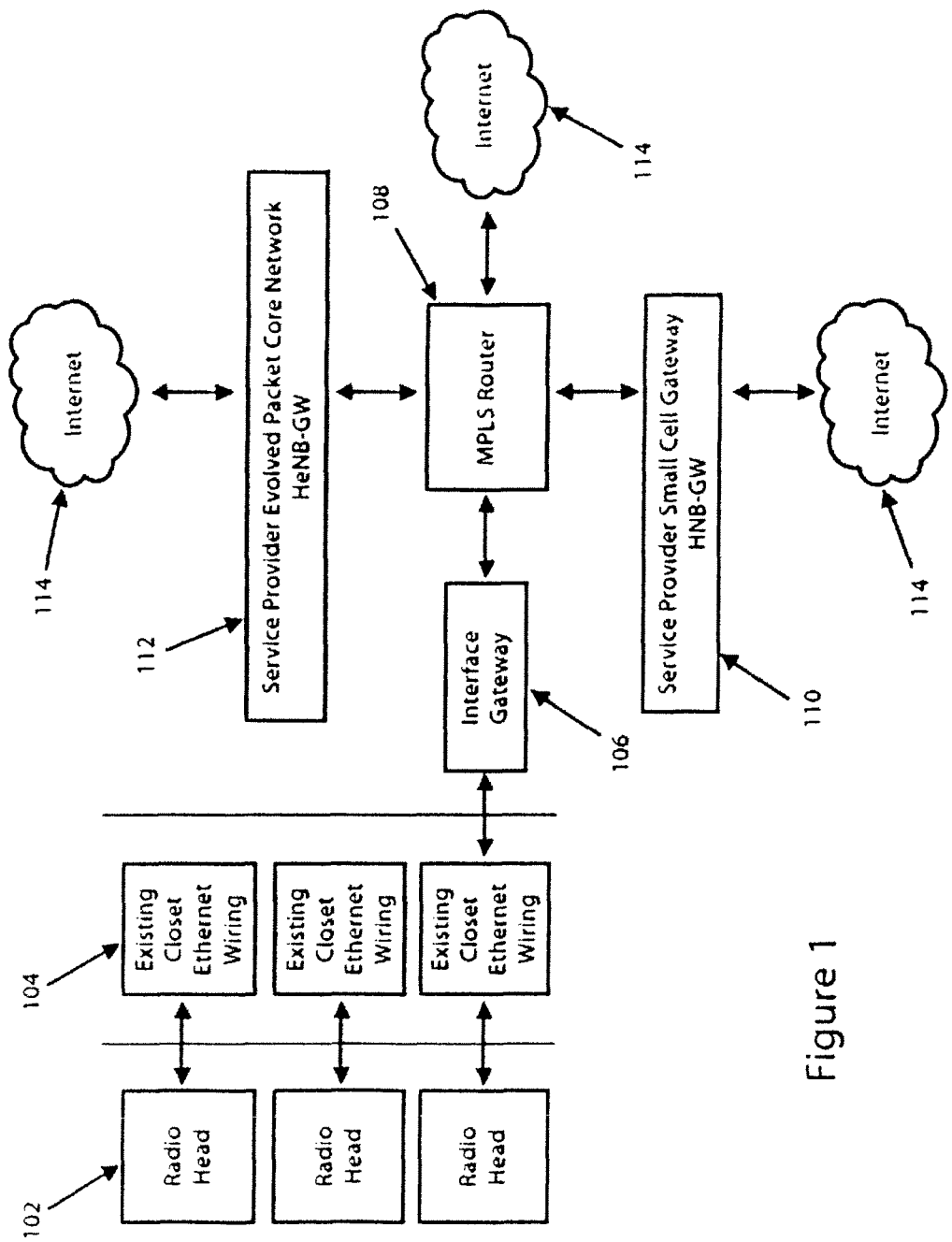
FIG. 1 depicts the system architecture of a mobile radio access network in accordance with an embodiment of the present invention.

FIG. 1 shows the core architecture of a mobile radio access network in accordance with an embodiment of the present invention. Radio Heads 102 provide a wideband analog front end to the network. The radio head also performs base band processing and digitization. Each radio head is connected into the existing closet Ethernet wiring 104 of a building. In particular, buildings conforming to the TIA/EIA 568 structured cabling systems standards will allow a uniform and repeatable installation process. The cables directly connect between each radio head and the interface gateway 106. The interface gateway is responsible for directing and receiving communication from each of the service providers. The interface gateway transmits data through the MPLS Router 108 which has a label based link to each service provider's small cell gateway (HNB-GW) 110 or evolved packet core gateway (HeNB-GW) 112. Unlike broadband internet routing, the list of data endpoints for this system is a known list of service providers which means complex routing table lookups are unnecessary. After processing the data from each radio head channel by the interface gateway, service provider networks will view the data as if they are communicating with a dense cluster of femtocells. This is possible because the interface gateway aggregates the information from many radio heads, which serve multiple services providers, and directs them to each service provider individually.

Data is ultimately routed to the service provider's macro-network at a Home NodeB Gateway (HNB-GW) for 3G or Home eNodeB Gateway (HeNB-GW) for LTE 816. These gateways are currently used in macro-networks for interfacing with femtocell radio network implementations. This means that this radio access network can appear to the macro-network as either a large collection of 3G femtocells or as an LTE eNodeB base station. By using this type of interface, no new protocols are needed to handle the handoff of callers, and the radio access network can be easily integrated into the existing macro-network infrastructure. Alternatively, if a particular service provider prefers not to see the radio access network as a collection of femtocells, the interface gateway has the capability of being programmed to communicate using a different preferred protocol. The interface gateway and MPLS devices can be located in a building basement where the existing closet Ethernet wiring 104 brings all of the radio head output cables to the location of a building's main Ethernet access area. Both internet connections and telephone communications come through the service provider gateway 110 in current cell network architectures. However, selected IP traffic can be routed directly from the MPLS Router 108 to the internet without traversing the service provider gateway 110. This technique is referred to as selected IP traffic offload (SIPTO) and there is work underway in the standards bodies to standardize this protocol. The intent of the SIPTO protocol is to allow for some internet communication to be offloaded from the service provider's core network and instead provide a direct connection to the Internet that does not utilize the HNB-GW and/or HeNB-GW. An embodiment of the present invention where the internet data connection is offloaded from the macro-network and comes directly from a broadband internet connection, for example, is also within the scope and spirit of this invention.

Figure 2:
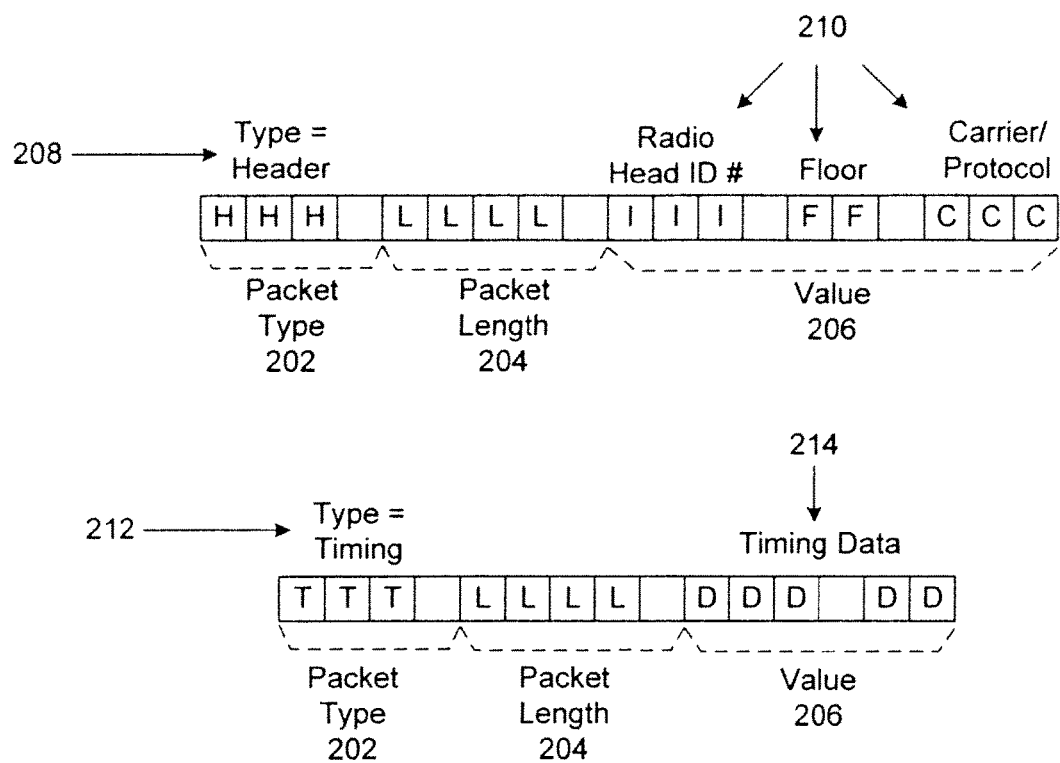
FIG. 2 depicts exemplary packets using optimized data encapsulation for communication between radio heads and the interface gateway.

The ability to achieve a high number of simultaneous channels in radio heads requires optimization of the amount of transmitted information. FIG. 2 illustrates an implementation of data encapsulation in accordance with an embodiment of the present invention. Because the communication between radio heads and the interface gateway is completely internal to the building, communication takes place over a layer 2 encapsulation method reducing the overhead associated with data that transmits over Internet Protocol. Key data is reduced into customized data packets that can be quickly processed to maximize throughput. The format of these data packets is programmable in both the radio heads and the interface gateway and as a result can be customized for a particular building. For example, each time a radio head sends data to the interface gateway, a header packet includes a radio head identification number, a floor number, the channel used, and a service provider identifier. Since there are a finite number of service providers, this information can be encoded using a three-bit or four-bit number rather than an ASCII string or other large data format the provider itself uses as identification. The goal of the data encapsulation is to allow efficient processing of radio head data through efficient use of the available processing power in an interface gateway. The radio head will effectively be able to decode information by looking up associated values in a table or memory location. While a specific set of data types and information has been described, one skilled in the art will recognize that size reducing encapsulation of other key pieces of information relevant to any of the functions of the mobile radio access network fall within the scope and spirit of the present invention.

For proper operation the radio heads and interface gateway must be properly synchronized in both time (phase) and frequency. Timing information is conveyed using timing over packet technology, which can be based on the IEEE 1588 protocol, also known as Precision Timing Protocol, or based on NTP (Network Timing Protocol). Since the communication between the radio heads and the interface gateway is internal to the system, the message set for the chosen protocol can be optimized for limiting bandwidth usage.

Figure 3A:
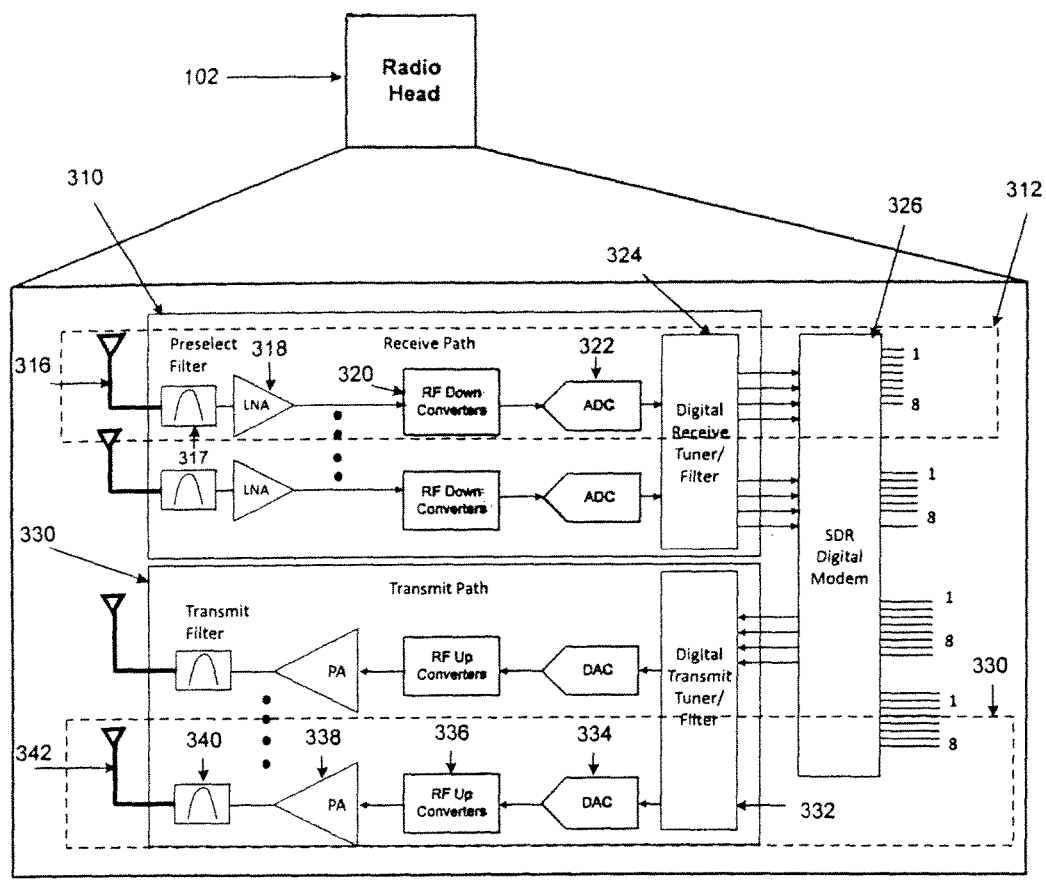
FIGS. 3a and 3b depict the architecture of a radio head in accordance with an embodiment of the present invention.

FIG. 3a is an embodiment of a channelized approach to a radio head transceiver in accordance with the present invention. A preselect filter 317 is tuned to a particular service or communications standard. The LNA 318 and down-converter 320 can be wide-band, or tuned to a particular band or service. Component selection is based on cost, power, performance, and availability. The down-converted signal is digitized by an ADC 322 that is optimized for a specific service. For a multi-channel receiver, there can be different LNAs, down-converters, and ADCs, with each component optimized for a particular service. The maximum bandwidth of the receiver in support of existing services is on the order of 10-20 MHz. Thus, for existing services, for a channelized receiver approach, the maximum required ADC sample rate is >40 MSPS. However, future protocols operate with increased bandwidth, such as 100 MHz of instantaneous bandwidth for LTE. For considerations of compatibility a channel may be optimized for a future service and appropriate components selected for the design of that channel. The digital receive tuner/filter 324 can be incorporated into a single/multiple FPGAs, or a single custom ASIC. This decision is driven by a number of design considerations. The output of the tuner will drive the software defined radio ("SDR") digital modem 326. The modem is software programmable, and it will support multiple cellular services, and is reconfigurable through software. The modem supports existing 3G/4G protocols, and can also be programmed to support future protocols. The modem resultantly can support multiple protocols, multiple simultaneous carriers, and multiple modulation standards.

The transmit path is the corollary of the receive path. A DAC 334 will produce the required modulated waveform, over the required instantaneous bandwidth, for a given cellular standard, as described above for the receive path. Each DAC will drive an up-converter 336 which will then drive a tuned RF Power Amplifier 338 ("PA"). The PA will be tuned for a particular service. The PA will not be required to be non-standard, or support multi-band, multi-mode transmit, unless components are available, and it is the technically correct solution. The typical solution will have the PA drive a service bandwidth filter 340 and the transmit antenna 342. All 3G/4G/Wi-Fi protocols are supported on the receive and transmit paths. All service providers/carriers will resultantly be supported by the same equipment.

In another embodiment of the present invention shown in FIG. 3a, the RF down converter 320 and ADC 322 can be replaced with an RF-sampling ADC. As long as the instantaneous bandwidth of the input signal is not greater than one half of the ADC sampling rate (Nyquist), the input bandwidth will be aliased into the first Nyquist region of the ADC. Presently, data converter products exist in the marketplace that can support this type of operation for existing communications protocols. This design choice can simplify the receiver front end by eliminating the down-converter components as well as the associated LO signal generation hardware (PLLs). Similarly, the DAC 334 and RF up converter 336 can be replaced with an RF DAC. There are currently DAC components available that directly synthesize RF waveforms without suffering the classical sin(x)/x gain roll-off of classical DACs in the second, third, etc. Nyquist regions. These DACs effectively directly synthesize RF bands that are centered around the center frequency of the RF carrier. Resultantly, there is no need for the up-converter hardware or the associated LO signal generation hardware. RF DAC and ADC performance is expected to continue to improve.

Figure 3B:
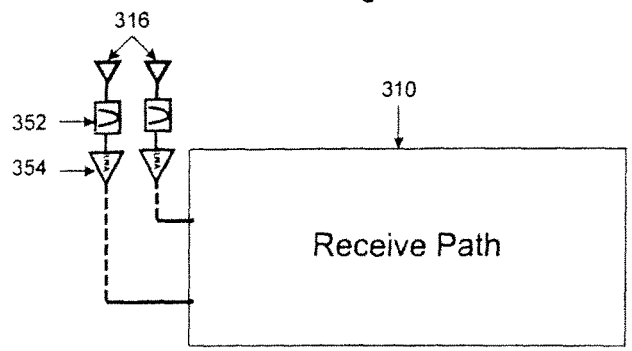

FIG. 3b depicts an embodiment of the present invention where distributed antennas are used for a single service or a set of distributed antennas is used for multiple services. Equivalently to a standard DAS system, distributed antennas 316 and LNAs 352 can be located across the floor of a building. This type of LNA is equivalent to the LNA that is located toward the top of a standard cellular tower that drives a long piece of coaxial cable to the base station. This component is typically called an antenna LNA. These LNAs can drive a long coaxial cable back to the radio head, which also has additional local LNAs (318 in FIG. 3a) in order to properly meet the sensitivity requirements for the receiver. This approach can be used for analog or digital beam-forming to enhance the sensitivity of the received channel for a particular service. The beam forming can be tailored to specific functions of the radio access network and building structure features as described below. The techniques and algorithms for beam-forming are well known to those skilled in the art. The distributed antenna system can provide superior performance to a single channel receiver. This approach is typically used in MIMO systems as well as military and, now, automotive radar. Additionally, the distributed antenna system can also be used to provide additional coverage of a given carrier service, or multiple carrier services, in a given area, without the need to replicate the entire radio head architecture of FIG. 3a, saving hardware and cost.

Figure 4:
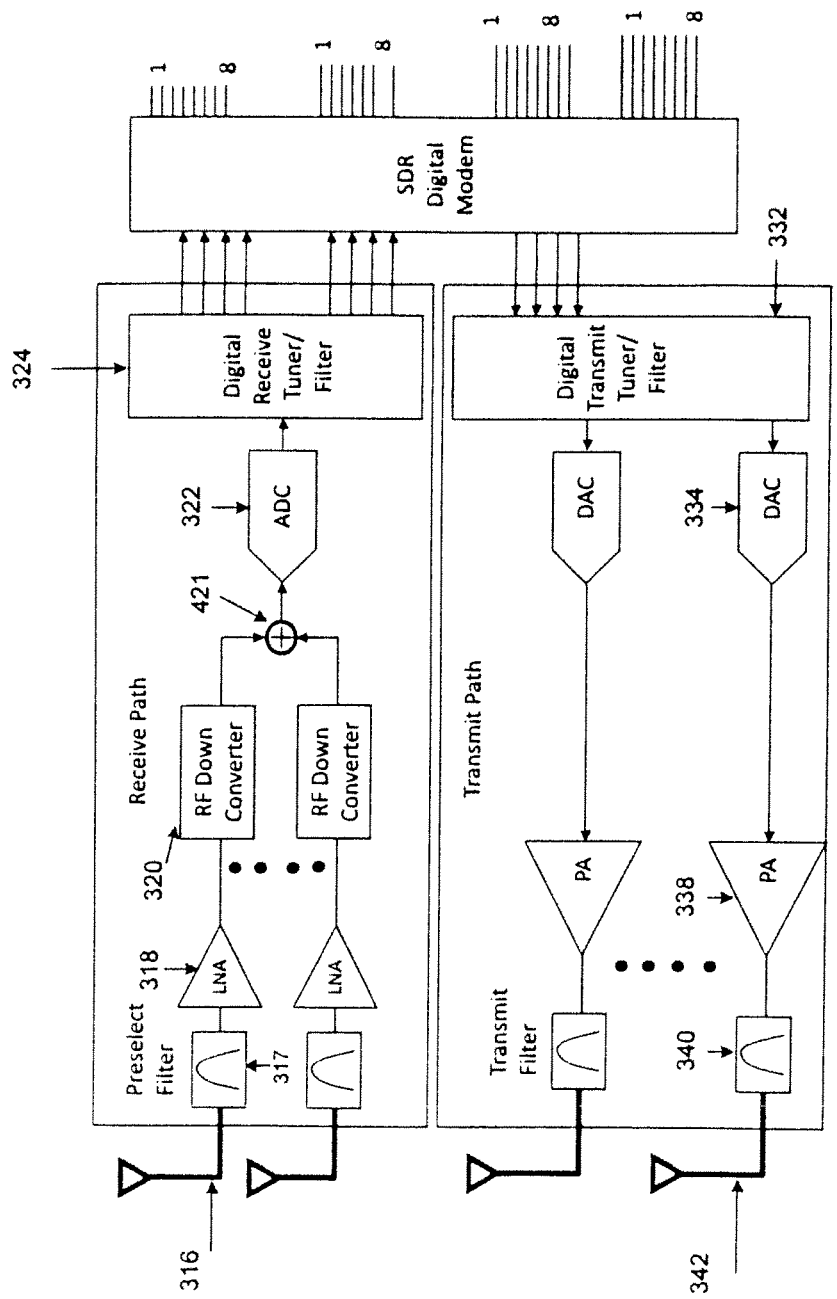
FIG. 4 depicts the internal architecture of a radio head in accordance with the present invention with a channel sharing receiver.

FIG. 4 depicts a radio transceiver in accordance with the present invention that shares the same hardware for multiple services. In this approach, a wide-band ADC 322 is used. Each receiver channel's Local Oscillator ("LO"), which drives an RF down-converter 320, is selected such that at base band there are multiple receive channels appropriately offset in frequency with the Nyquist bandwidth of the ADC (See FIG. 5). A base band summing amplifier 421, for example, can sum all of the receive channels, and the summation is digitized by a single ADC 322. The summed service bandwidths are designed such that they collectively do not violate the Nyquist criterion, and the link budgets must be properly considered to prevent the summed power from saturating the ADC. For this approach, hardware is saved over the architectural approach given in FIG. 3a.

Figure 5:
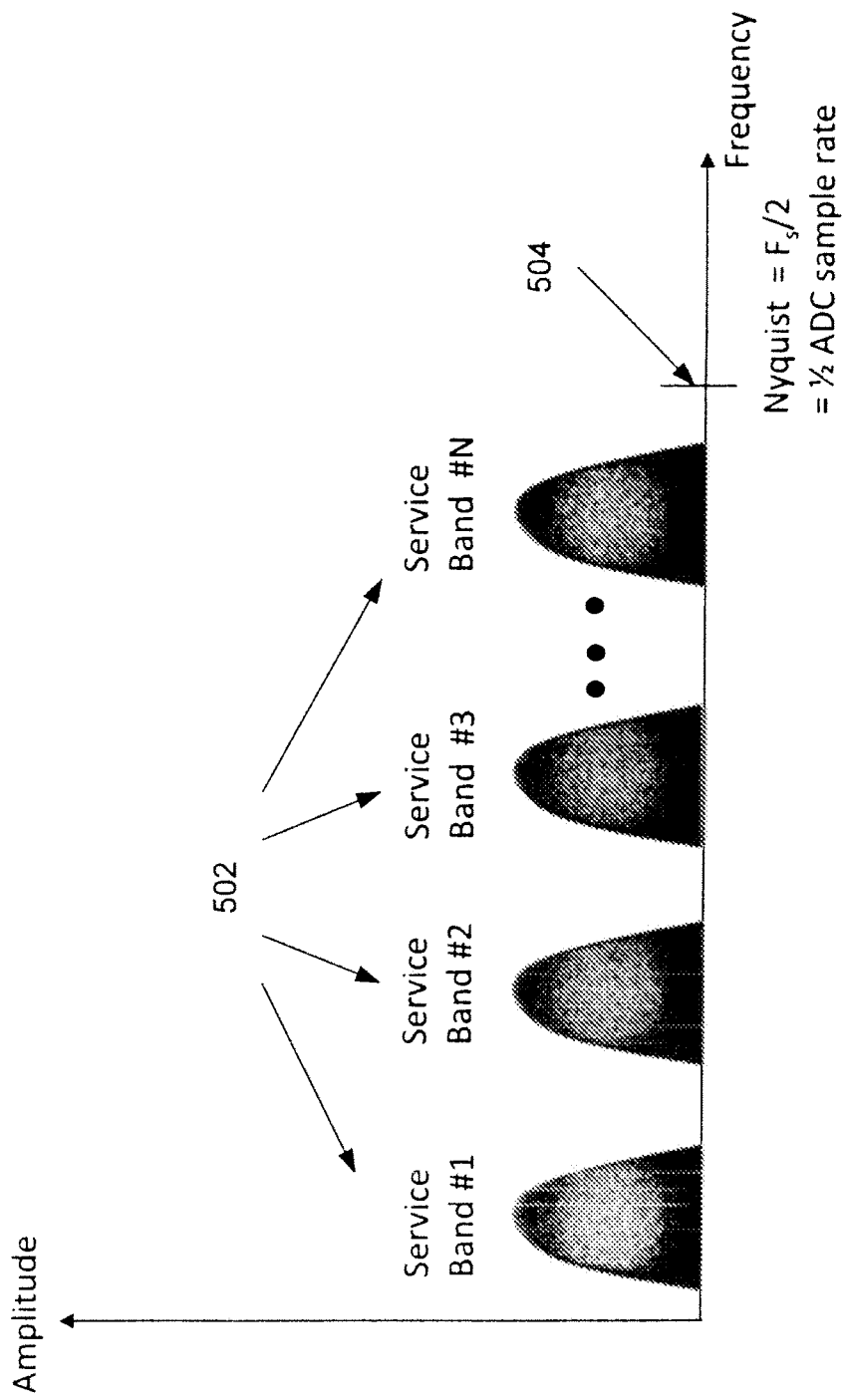
FIG. 5 depicts a graphical depiction of the frequency spectrum below the ADC Nyquist frequency shared by multiple input signals.

The concept of the appropriate signal bandwidths resulting from the summation by the summation amplifier 421 is shown in FIG. 5. In FIG. 5 multiple RF front ends use different LO frequencies to selectively place the down-converted input signal service band into a designated portion of the input spectrum 502 of the ADC. The bands can be placed so that they do not mutually interfere, while all falling within the first Nyquist region 504 of the ADC 322. This allows a single ADC to convert the bandwidths for multiple front end inputs simultaneously.

Figure 6A:
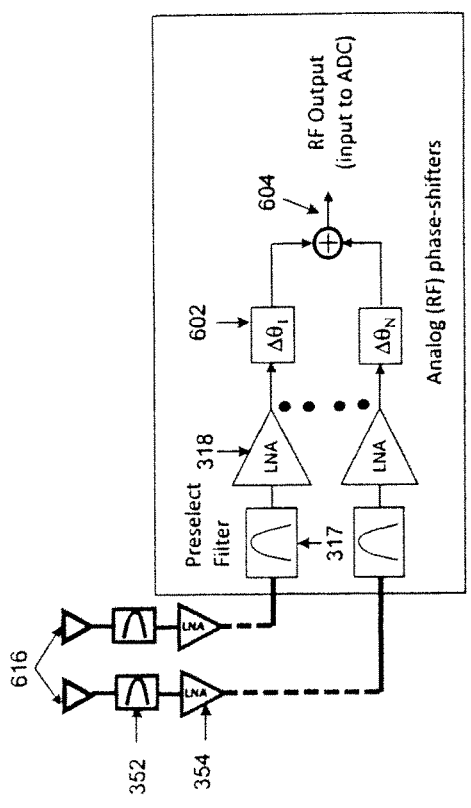
FIGS. 6a and 6b depict receiver and transmitter beam forming architectures utilizing phase shifting techniques.

FIG. 6a depicts an approach to beam-forming in the radio access network receiver. In this approach there are multiple antennas for the same service 616. The received signals are phase shifted in the RF domain through a digitally programmable phase shifter 602. The summed RF output 604 can continue to be down-converted through normal down-converter hardware (See FIG. 3a) or direct RF sampled (See FIG. 3a description). This technique can be taken advantage of for multiple services. The beamforming approach also helps to reduce the hardware needed to support the overall radio access network by increasing the area effectively serviced by a single radio head. The benefits of this architecture are well documented, and those skilled in the art can appreciate the benefits from a performance perspective, as well as a cost perspective. It should be noted that the phase shifted outputs in FIG. 6a do not have to be summed after shifting, as shown in FIG. 6a. The phase shifted outputs can also go through conventional down-converter paths and be summed in the digital domain. Also, it is possible to digitize each LNA 318 output individually and perform a digital phase shift 602. The digital phase shift approach may not be desirable because of the additionally required hardware. One skilled in the art will recognize that trade-offs in design requirements will influence the final architecture.

Figure 6B:
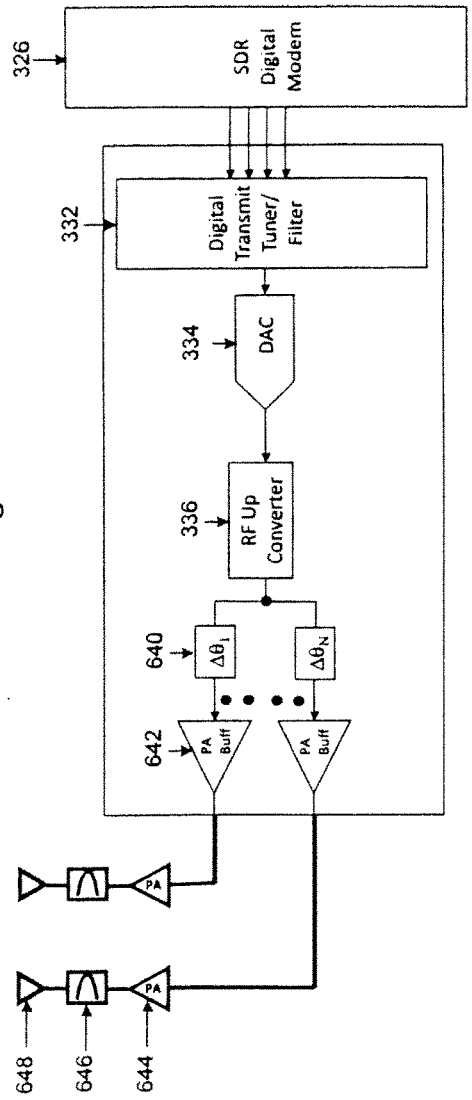

FIG. 6b depicts a corresponding beam-forming transmitter capable of communicating with the receiver depicted in FIG. 6a. This architecture is merely one possible embodiment of a beam-forming transmitter architecture for a radio head in a radio access network in accordance with the present invention. In this embodiment, the output of the RF up-converter is split into N (a positive integer) number of digitally controlled phase shifters 640. Each phase shifter drives a PA buffer amplifier internal to the radio head. At the end of a coaxial line, an additional PA 644 and transmit filter 646 drive a remotely located transmit antenna. Alternatively, the PA and transmit filter can be located within the transmitter driving a local antenna. The transmitter outputs can be reconstructed in a receiver architecture such as in FIG. 6a or the distributed antenna architecture approach can be used merely to provide more coverage of a given area. In another embodiment, the output of the DAC 334 can be split into multiple up-converters which then drive phase shifters. This is done at the expense of additional hardware.

An additional transmit beam-forming architecture is shown in FIG. 7a. Beam-forming can be accomplished through either phase or frequency shifting. The previous architectures shown for receive and transmit are based on phase shifting the signal. A second approach for digital beam-forming is frequency shifting. In FIG. 7a, the DAC 334 output signal is frequency translated in multiple up-converter paths 336 through the use of different LO frequencies into each mixer. This approach provides a frequency translated version of the input signal in multiple transmit paths. Reception of these transmitted signals can be obtained by the previously depicted receiver architectures.

FIG. 7b depicts a frequency shifting receiver architecture corresponding to the transmitter in FIG. 7a. This architecture can be implemented with a slight modification to the architecture in FIG. 4. The change is comprised of using different LO frequencies for the RF down-converters 320. The block diagram is shown here for the sake of completeness and to provide a clear understanding of the use of the architecture in FIG. 4 for the present embodiment of a digital beam-forming receiver. This adaptation supports the concept that the architectures shown above are flexible and are driven by the system approach. The receive and transmit beam-forming architectures shown can be used in commercial applications for Multiple-In, Multiple-Out ("MIMO") transceivers for a variety of mobile device applications, as well as stationary base station and radio head applications.

The above described radio head transceiver architectures are meant to support all possible 3G/4G cell services internationally as well as Wi-Fi, and any other possible non-cellular services needed in support of possible operational modes for the transceiver unit and radio head. The transceiver can be configured as necessary to support the number of services required. The number of separate receiver channels required is based on the services that must be supported. This includes, but is not limited to, UMTS/WCDMA, EDGE, and CDMA-2000 for 3G services in the United States and TD-SCDMA in the Far East for 3G cell service. FDD and TDD cell services are supported. Full duplex and half-duplex services are supported. In the United States, 4G services include LTE FDD and LTE MIMO, and in the Far East there is also TD LTE. The architecture will scale, in terms of instantaneous achievable bandwidth, with the components available. 802.11a, b, g, n, etc. Wi-Fi services will also be supported by this architecture. In the various shown embodiments of the receiver path, each channel up to N channels, can be dedicated to a separate service, or can be shared for multiple services. The channels can all be dedicated to cellular services, or can be dedicated to cellular plus other services. The antennas and pre-select filters are tuned for particular services.

When the network detects users within the receiver range of the radio head, it then uses frequency and modulation characteristics of a device signal to determine a device's communication protocol. For example, in communications standards where users are allocated a small amount of bandwidth, the transmission frequency is indicative of both the service provider and communications protocol of the signal because each provider has licensed their own spectrum. However, in protocols like Code Division Multiple Access ("CDMA") where a broader spectrum is shared, a different technique such as reading carrier information from the unencrypted header of communicated data containing service provider identification can be used. This service provider information can also be obtained by monitoring radio waves for transmissions from external macro-network base stations. Alternatively, the existing networks in the area can be programmed into the interface gateway software at the time of installation or at a later time through a software change which can be performed locally or remotely. This information is used to configure an appropriate transmit and receive channel in the SDR software for communication with the device. Because of this adaptability, the radio head acts as a ubiquitous transceiver for different service providers and communications protocols that is transparent to the user. This overcomes a significant disadvantage present in femtocells, picocells, and DAS systems that are provider specific. For example, comparable functionality using existing femtocell technology would require at least one femtocell for each service provider to provide similar telephony capability to a radio head in accordance with the present invention. This would require nearly an order of magnitude greater number of pieces of hardware to provide the same service. Furthermore, the network of femtocells would still potentially lack some of the additional capabilities of the present radio access network described below.

Using an ingress and egress detection method the detection process begins as soon as a user enters a building. When the signal from the macro-network begins to attenuate, mobile devices increase their transmission power in order to maintain connection to the network. When this occurs, a sally port receiver detects the connection protocol and service provider of the device. The sally port receiver can be implemented using a slightly modified radio head, for example a radio head with the transmit pathway disabled. Detection of the arrival of a new mobile device into the jurisdiction of the intra-building radio network can also be achieved using directional capabilities of the radio head antenna system. Given an antenna pattern that favors the inside of the building relative to the outside, the signal strength of the mobile transmitter as received by the Radio Head will be greater when the mobile device is inside compared to immediately outside the building. This detection capability does not rely on the mobile device adjusting its transmit signal power.

This information is used to identify entering users as they are entering the building. This information is shared with the rest of the radio network, possibly in a table within the interface gateway. The interface gateway can determine whether the radio access network has available channels capable of handling the new user. The network can either reallocate idle resources to the user's protocol or place the user in a queue if none are available. If a channel is available, the appropriate radio heads establish a communication block within the SDR (See FIG. 3) capable of handling the user. The mobile radio access network then communicates with the provider network to negotiate handoff of the user. At the same time the interface gateway coordinates with the radio heads to reallocate resources as needed for other users. The communication with the user's device remains on licensed spectrum and the user is detected automatically at the sally port. Similarly, when a device user is connected to the mobile radio access network and begins exiting from the sally port, the mobile radio access network can begin negotiating handoff of the user back to the macro-network. Protocol detection in combination with the interaction between the interface gateway and the macro-networks described below allows for a seamless user experience during both ingress and egress.

The radio access network will also receive signals that originate outside of the building from the service provider macro-networks. By monitoring these signals, the radio network will be able to determine which service providers are active, the frequency bands in use, and the associated communications standards. Also, It is assumed that the timing references associated with a service provider's network have favorable characteristics. These timing references can be compared with the timing references of the radio heads and used to monitor, and calibrate, the indoor radio access network's timing performance.

In addition to attenuation of mobile radio signals, the building walls and roof often severely attenuate GPS signals and consequently mobile device location methods based on GPS do not function satisfactorily within a building. However, knowing the location of each user within a building is necessary for some mobile device applications. For example, this information can be used in coordination with the active RF power function of the radio heads to make sure that power received by the user is sufficient. Additionally, the location of a mobile device user could be used to send targeted advertisements to that user based on their proximity to a store in a shopping mall.

Figure 8A:
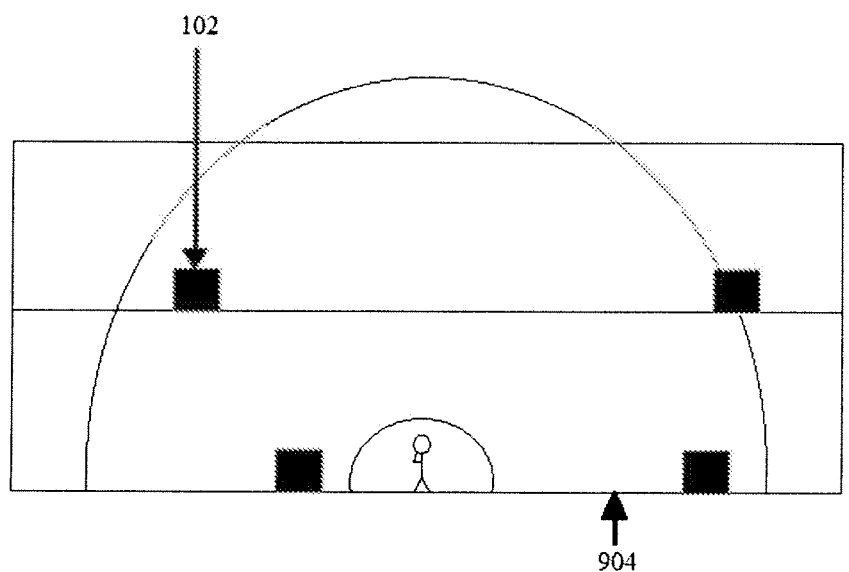
FIGS. 8a and 8b depict two different mobile device user locating techniques.
Figure 8B:
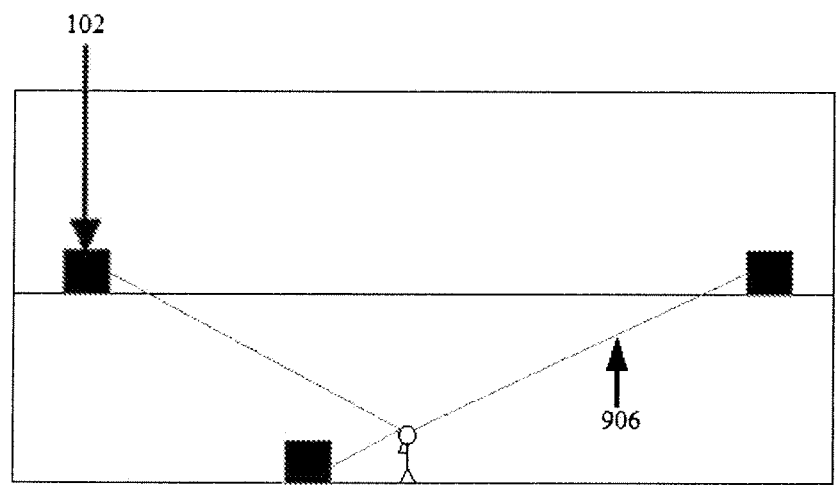

FIGS. 8a and 8b illustrate a user location detection function implemented within the radio access network using the radio heads to determine mobile device and user location. FIG. 8a shows a mobile radio access network using a relative received power to determine the location of a user. The received power level from a particular mobile device is measured by at least four different radio heads 102. Since the absolute transmitted power by the mobile device is unknown, the relative received signal strength 904 (depicted with lighter shading at increased distance from the device) at the radio heads are compared and the location of the mobile device can be estimated based on the relative distances from the radio heads. FIG. 8*b* shows a mobile radio access network using a time of arrival approach to locating the position of a mobile device. In this layout, radio heads 102 will look for a special signal or signal feature and create a timestamp of the signal feature arrival. Using the travel time of signals traveling through air at approximately 1 ns/ft over a distance between the device and the radio head 906, the relative position of the device is determined. In order for this method to be accurate, synchronization of the radio head timing is needed. Problems with the synchronization can also be determined by the use of additional radio heads. The approaches shown in FIGS. 8*a* and 8*b* can be used concurrently and by suitable averaging the location estimate can be improved. The position of the radio heads could potentially be programmed during radio head installation for maximum accuracy, but the techniques shown in FIGS. 8*a* and 8*b*, namely based on power measurement and time-of-arrival measurement, can also be applied for the radio heads to determine their own relative positions. As shown below in FIG. 10, sensors 1104 can monitor the transmission from the radio head(s) 102. This extra capability would allow the location measurements to remain accurate even if the radio heads are moved from the manually entered positions at installation.

These location methods are possible because of the aggregation of radio head data by the interface. A system of independent femtocells would be poorly suited to provide similar functionality because femtocells are designed to communicate directly with the service provider network. The scale of a large mobile network would make implementing this type of functionality remotely unwieldy and expensive because the network would need to know the physical location of each femtocell. Having radio head data that includes location information and including an interface gateway to manage this data reduces the task of device location to an achievable scale.

It should be noted that the location information provided does not only give latitude and longitude coordinates for each mobile device. The radio heads have floor information, allowing a user to be even more precisely located by including information about their altitude. This information is particularly useful when an emergency "911" phone call is made and the caller is unable to convey their exact location. The exact location information could be conveyed directly to emergency responders by remotely accessing the interface gateway data at a building security computer terminal. Also, it would not be difficult for a mobile service to gather the additional altitude or floor information in addition to other location information which would be relayed to emergency responders directly.

Figure 11:
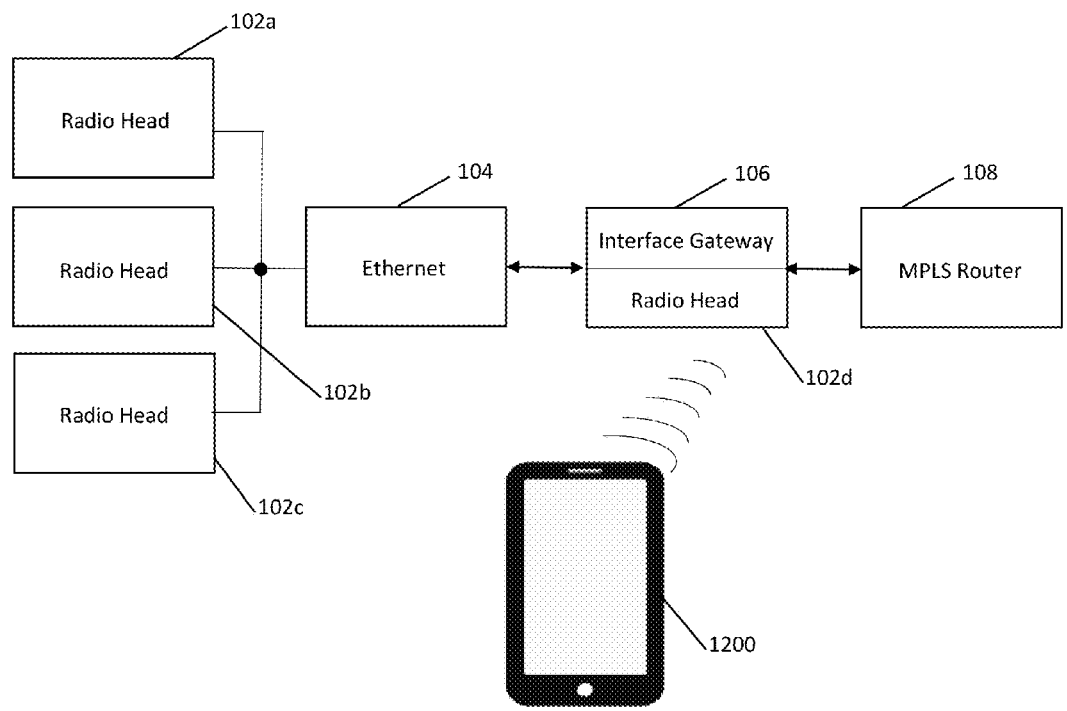
FIG. 11 depicts the system architecture of a mobile radio access network in accordance with another embodiment of the present invention.

In one embodiment of the present invention, a distributed system is used to convey location information to at least one emergency responder. Such a system is shown in FIG. 11, and includes at least one wireless device 1200 and at least one centralized device (e.g., interface gateway 106 and/or radio head 102*d*) in communication with a plurality of radio heads (e.g., 102*a*, 102*b*, 102*c*). As discussed above, the centralized device is configured to recognize when the wireless device 1200 has entered a particular service area (e.g., entered a particular building) and receive a notification from the wireless device when the device is being used to make an emergency "911" phone call.

Figure 12:
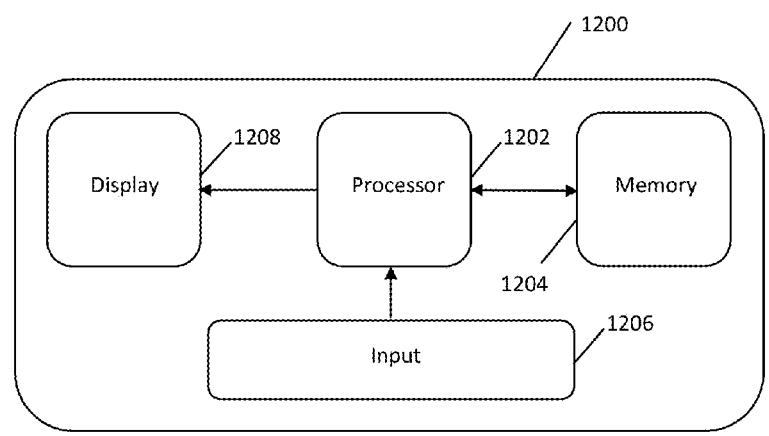
FIG. 12 depicts one embodiment of the wireless device depicted in FIG. 11.

In particular, the wireless device 1200, as shown in FIG. 12, includes at least one processor 1202, a display device 1208 (e.g., an LCD display), an input device 1206 (e.g., a keyboard, touchpad, touchscreen, etc.), and at least one memory device 1204 (e.g., internal memory (DRAM, DDRAM, RDRAM, ROM, etc.) and/or external memory (e.g., SD card, SIM card, flash memory, etc.), wherein the processor 1202 is configured to receive at least one user input from the input device 1206 and to display at least one image on the display device 1208, and the at least one memory device 1204 is configured to store code that either directly or indirectly notifies the centralized device (see, e.g., FIG. 11) that the wireless device 1200 is being used to make an emergency "911" phone call. It should be appreciated that the present invention is not limited to any particular code or the storage of said code in any particular location. For example, the storage of an application in internal and/or external memory, wherein the application is configured to detect an emergency phone call, is within the spirit and scope of the present invention. By way of another example, the storage of code in internal and/or external memory, wherein the code can be activated to download and/or open an application configured to detect an emergency phone call, is within the spirit and scope of the present invention.

In one embodiment of the present invention, code is included in a SIM card portion of the memory device 1204 and is configured to receive a wake-up command from the centralized device and, in response thereto, either (a) activate (or open) an application previously stored on the wireless device or (b) download an application to the wireless device and activate (or open) the application. The application, once activated (or opened), is configured to monitor the wireless device, or a portion thereof, to detect a communication (e.g., phone call, text, etc.) with an emergency responder. If the application detects a communication with an emergency responder, then the application is configured to notify the centralized device of the same. The application (or alternatively the code) is further configured to receive periodic "pings," or other wireless signals, from the centralized device, informing the application (or code) that the wireless device is still within the particular service area (e.g., still within the building), and that the application should continue its monitoring functionality. If the application (or code) does not receive a "ping" within a predetermined period of time, or if the application (or code) is notified by the centralized device that the wireless device is leaving the particular service area (e.g., leaving the building), then the application (or code) is configured to stop (or instruct the application to stop) its monitoring functionality (e.g., close the application). Further, if a "ping" is not received during the predetermined period of time, or the wireless device is notified that it is leaving the particular service area, the code may further be configured to delete the application from the wireless device, or the memory portion thereof.

It should be appreciated that the foregoing embodiment is not limited to the detection of an emergency communication, and may include the detection of any function performed by the wireless device, a location of the wireless device, or any input to the wireless device. For example, the application may be configured to detect a user inputting a request to dial 911, a phone application dialing 911, or the transmission of a 911 communication. By way of another example, the application may be configured to detect a different input and/or function of the wireless device (e.g., opening a web browser, using a web browser to request certain information, etc.), or a particular location of the wireless device (e.g., a GPS location, entering a particular service area, etc.).

It should also be appreciated that the foregoing embodiment is not limited to transmitting a mere notification that a detection has been made, but may include additional information about the wireless device, the user of the wireless device, or a function that is being performed. For example, the notification may include identifying information on the wireless device (e.g., make, model, etc.) and/or user (e.g., gender, age, frequently visited websites, recently visited websites, recent purchases, etc.), the location of the wireless device, applications that are open (or are on the wireless device), or particular user inputs or functionalities that are being performed by the wireless device. For example, if the user has opened a web browser and is searching for a nearby restaurant, such information may be communicated to the centralized device, thereby allowing the centralized device to respond accordingly, as discussed further below.

The application may also be configured to instruct (or request) the centralized device to carry out a particular function (e.g., provide certain information to a certain third party, etc.). It should further be appreciated that the application may exist as an autonomous application, functioning without user intervention and/or notification, or as an application visible to the user on the display. With respect to the prior, the application can be downloaded, deleted, opened and/or closed by code stored on the wireless device. With respect to the latter, the user can interact with the application (or related code), and choose to download, delete, open and/or close the application, and/or modify settings associated with the application (or related code) (e.g., set the types of inputs and/or functionalities that the application can detect, set the types of information that can be provided to the centralized device (e.g., turning off or limit the transmission of personal information, etc.), set the types of instructions (or requests) that are provided to the centralized device, set the period of time associated with the foregoing "ping," etc.).

Referring back to FIG. 11, the centralized device (e.g., interface gateway 106 and/or radio head 102d) is configured to communicate with the remote radio heads (e.g., 102a, 102b, 102c) via the Ethernet wiring 104 and the service providers via the MPLS router 108, as previously discussed. In one embodiment of the present invention, the radio head portion of the centralized device is configured to detect ingress and egress of the wireless device (e.g., the wireless device entering the building and the wireless device leaving the building), as previously discussed, and to transmit a wake-up signal to the wireless device after ingress has been detected. The radio head portion of the centralized device is then configured to transmit a "ping" (or another recognizable signal) after a predetermined period of time, and to continue to transmit the same after said predetermined period of time thereafter and prior to detection of egress of the wireless device. The "ping" functions to notify the wireless device that it is still within the particular service area, and that the application should continue its detection functionality. As discussed above, once egress has been detected, and the "ping" is no longer transmitted, the application (or associated code) may be configured to close and/or delete the application. It should be appreciated that the present invention is not limited to a centralized device that includes an interface gateway and/or radio head, as shown in FIG. 11. For example, a radio head that is remote from the interface gateway, or one of the remote radio heads, or any remote or local transceiver in communication with the interface gateway or controller associated therewith (not shown), may be configured to detect ingress/egress, transmit the wake-up signal, transmit the "pings," and/or receive the notification signal. By way of another example, more than one radio head (or transceiver) may be configured to perform the foregoing functions. For example, using a first radio head 102d to detect ingress and transmit the wake-up signal, and at least one other radio head (e.g., 102a, 102b, and/or 102c) to transmit at least one "ping" signal and receive the notification signal is within the spirit and scope of the present invention.

In one embodiment of the present invention, the centralized device is configured to receive (e.g., via at least one radio head) a notification from the application once a detection has been made. The notification is then acted upon by the centralized device, or a controller portion thereof (not shown). For example, if the notification is based on a detection of an emergency "911" phone call, then the centralized device may be configured to provide location information of the wireless device to at least one emergency responder (e.g., a 911 dispatch center, security for the building, local police/fire, etc.). The location information of the wireless device, which may include X, Y and/or Z-axis (e.g., floor) information, can be provided to the centralized device as previously discussed. The location information can then be updated, if necessary, to inform the emergency responder that the wireless device has moved, or is on the move.

It should be appreciated that the present invention is not limited to a particular time and/or a particular manner of providing location information to the emergency responder. For example, the location information may be provided to the emergency responder at the same time, before or after the 911 communication is provided to the wireless service provider (e.g., via the MPLS router). By way of another example, the location information may be provided to the emergency responder via a communication over the Internet or a wireless service provider (e.g., a phone call, a text, etc.), and may include information that can be used by the emergency responder to link the location information to the user-initiated 911 communication (e.g., user's name, wireless device ID, communication ID, etc.). Alternatively, the location information can be inserted into the user-initiated 911 communication (e.g., by replacing or modifying the location information that is included in the user-initiated 911 communication).

It should be appreciated that while the notification signal may merely indicate that the user has made a 911 phone call, the notification signal may also include additional information, or may notify the centralized device of a particular user input or wireless device functionality. For example, the emergency response notification may also include information on the user, the wireless device, or the user-initiated 911 communication, which can be used by the centralized device (or the emergency responder) to link the location information to the user-initiated 911 communication (e.g., user name, device ID, communication ID, etc.). By way of another example, if the notification signal identifies a user input, an application that has been opened, or information that is being acquired by the user, the centralized device may be configured to use that information to provide certain data to the wireless device, or to communicate that information to the wireless service provider so that they, or a third party on their behalf, can provide certain data to the wireless device.

For example, if the user is requesting data on nearby restaurants, or a web browser is being used to gather data on nearby restaurants, related data can be provided to the centralized device (via the application), which can then be used (e.g., by the centralized device, the wireless service provider, a third party, etc.) to provide data (e.g., ratings, reviews, availability, location, hours, pricing, coupons, etc.)

on at least one nearby restaurant, or at least one restaurant provided to the user in the search results for nearby restaurants. By way of another example, if the user is accessing a website of a company located within the building, and the wireless device is on a floor associated with the company, related data can be provided to the centralized device (via the application), which can then be used (e.g., by the centralized device, the wireless service provider, a third party, etc.) to direct the wireless device to the company's Intranet, or provide the wireless device with authorization (e.g., password, login data, etc.) to access the company's Intranet, or wireless Internet.

It should be appreciated that the foregoing examples are just that, examples, and are should not be construed as limitations of the present invention. Thus, use of an application to notify the centralized device of any situation, thereby allowing any related function to be carried out, is within the spirit and scope of the present invention. While the present invention may be particularly useful in providing location information to at least one emergency responder, it can also be used to provide the wireless device, either directly or indirectly via a wireless service provide or a related third party, with data regarding, for example, security, advertising, or a particular service.

Figure 13:
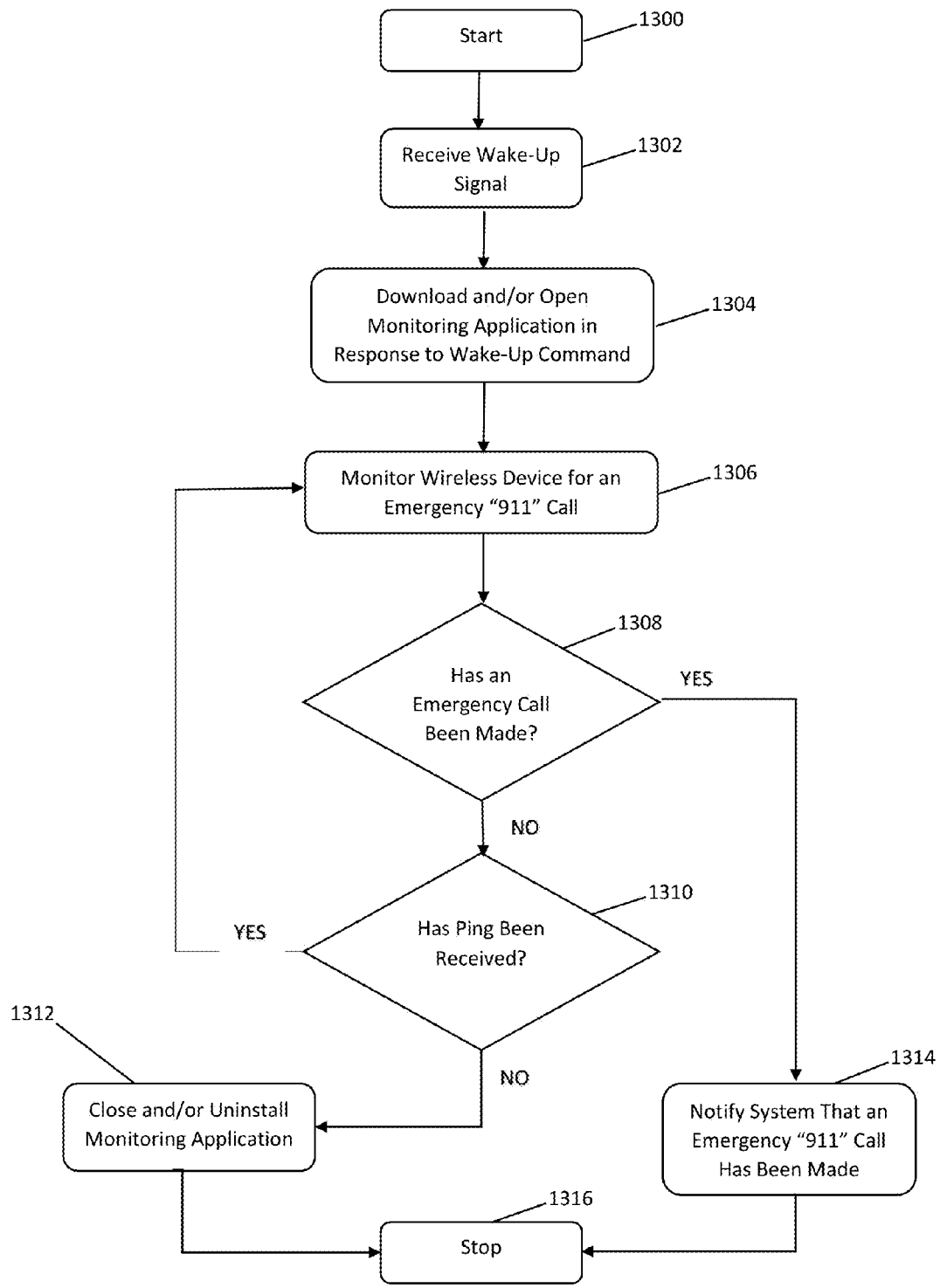
FIG. 13 depicts a method in accordance with one embodiment of the present invention for determining whether a request for emergency assistance has been made by a user of a wireless device.

One method of monitoring a wireless device for the transmission of an emergency communication is shown in FIG. 13. Starting at step 1300, a wake-up signal is received at step 1302, which preferably happens once the wireless device has entered the particular service area (e.g., entered the building). At step 1304 and in response to the wake-up signal, a monitoring application is downloaded and/or activated (or opened). Once opened, the application functions by monitoring the wireless device for a request for emergency assistance at step 1306, which may be a 911 telephone call, a 911 text, or an interaction with the application to request emergency assistance. At step 1308, it is determined whether a request for emergency assistance has been made. If it has, then a notification signal is provided to the centralized device at step 1314. If it has not, then it is determined whether a "ping" has been received from the centralized device during a predetermined period of time at step 1310. If it has, then the application continues to monitor for emergency assistance at step 1306. If it has not, then the application is closed and/or uninstalled at step 1312, ending the method at step 1316. It should be appreciated that the present invention is not limited to the steps recited in FIG. 13, or the order in which they are recited. For example, the method may further include a counter for the predetermined period of time, which is decremented until it reaches zero. If the answer to step 1310 is NO and the counter is not zero, then the application continues to monitor at step 1306. If, however, the answer to step 1310 is NO and the counter is zero, then the application is closed and/or uninstalled at step 1312. Finally, if the answer to step 1310 is YES, then the counter is reset.

Figure 14:
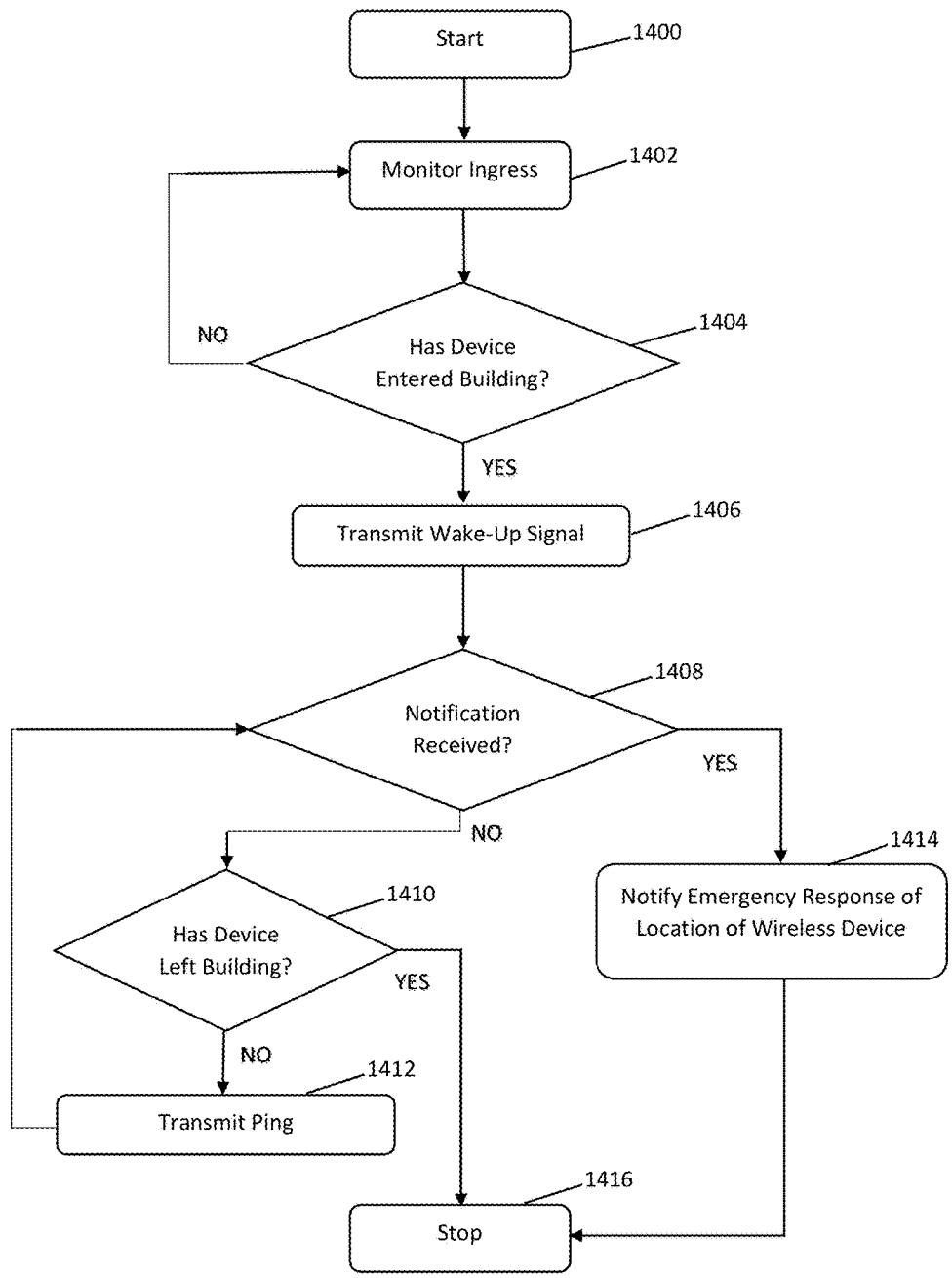
FIG. 14 depicts a method in accordance with one embodiment of the present invention for providing location information to an emergency responder.

One method of providing location information to an emergency responder is shown in FIG. 14. Starting at step 1400, ingress of a wireless device (e.g., entering a building) is monitored at step 1402. This continues until a wireless device is detected. If it has been determined that a wireless device has entered the building at step 1404, then a wake-up signal is transmitted at step 1406. Then, a determination is made to see if a notification signal has been received at step 1408. If it has, then location information is sent to an emergency responder at step 1414, ending the method at step 1416. If a notification signal is not received, then it is determined whether the wireless device has left the building at step 1410. If the answer is YES, then the method ends at step 1416. If, however, the answer is NO, then a "ping" is transmitted to the wireless device at step 1412, and the method continues at step 1408. It should be appreciated that the present invention is not limited to the steps recited in FIG. 14, or the order in which they are recited. For example, the method may further include a counter, where the "ping" is transmitted after the counter equals (or gets substantially close to) zero. This would result in the "ping" signal being transmitted much less frequently than that shown in FIG. 14, but sufficiently to prevent the application from being closed and/or uninstalled if the wireless device is within the predetermined service area (e.g., still inside the building).

Figure 9:
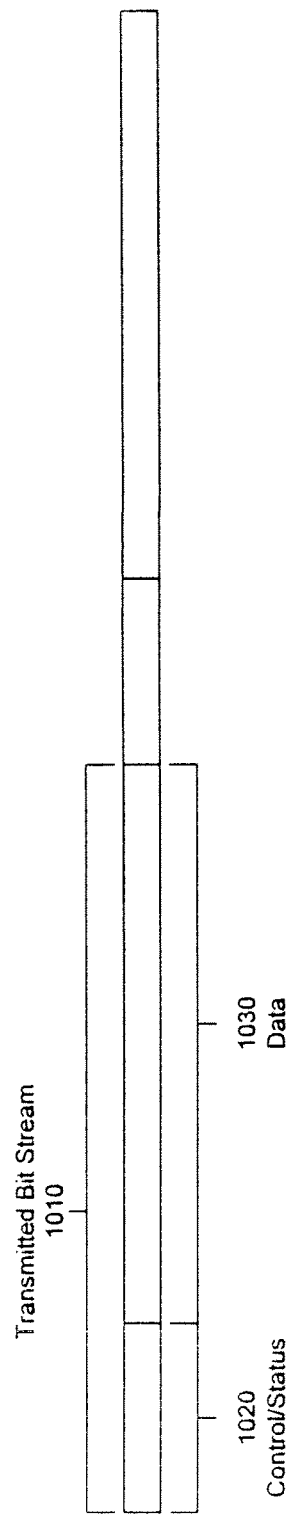
FIG. 9 depicts a data transmission structure that can be used to determine time-of-arrival information.

With reference back to FIG. 9, a mobile device may transmit a data bit-stream comprising two categories of data. One category 1020 contains status and or control information including, but not limited to, the telephone identity, the power levels of the received signal from the base station, the identities of the base stations in view, and so on. The other category 1030 is the actual information such as, for example, the audio/video/data information originating at the mobile device. The control/status information is generally not encrypted but the audio/video/data information may be encrypted. Each modulation and access scheme has its particular format but the principle depicted in FIG. 9 is universal. The access scheme defines the particulars of how to identify the status/control information block from the audio/video/data information block, which together form the transmitted data 1010. Presence of an identifiable data pattern provides a suitable characteristic event that can be detected and time-stamped by the receiver.

While providing network access within the building is important to service providers, it is desirable to do so without interfering with the macro-networks outside of the building. By allowing the radio heads to determine the power level of their transmission at different locations within the building, the radio head can determine whether power levels are too high and will potentially result in interference with outside networks. Since the radio heads are capable of transmitting over multiple carrier frequencies, this operation can be performed independently for each communication protocol using the same type of chirp signal. The channel independence prevents adjustment due to high RF power levels in one channel from causing another channel's power level to go too low. However, for simplicity, power levels can instead be controlled by changing all channel power levels through a single proportional control as described below.

Figure 10:
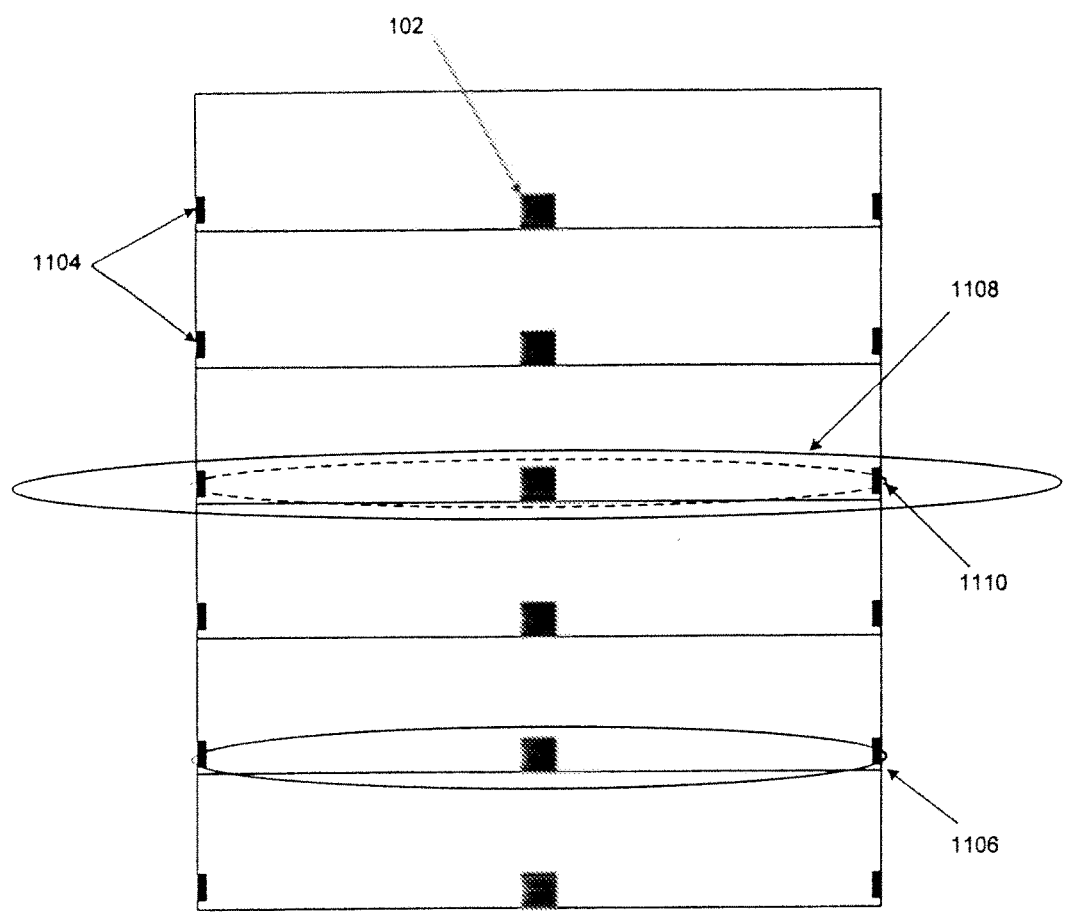
FIG. 10 depicts an implementation of an RF power management framework.

FIG. 10 illustrates a mobile network in a building and shows the result of active RF power management. Radio heads 102 are located centrally on each floor of the building. RF energy sensors 1104 can be placed around the perimeter of the building where they can detect the amount of energy coming from radio heads that might interfere with the macro-network outside of the building. The curve 1106 represents a radius from the smart radio head where the power level is within acceptable power levels for interference with the macro-network. The power level falls off at the walls of the building, and thus interference is minimal. Curve 1108 shows a power radius of a radio head that is transmitting enough power that there is potential for interference with the macro-network. The RF energy sensors 1104 detect this high power level, and communicate with interface gateway to command the radio head to reduce transmission power. The system can determine the identity of the transmitter based on the carrier frequency being used/detected and/or other identifying features such as the radio head identifier in the status/control data. Once the excessive power condition is detected, the interface gateway passes a command to the radio head to reduce transmit power. Curve 1110 shows the resulting radius of the acceptable transmit power after the adjustment.

With the measured power of each radio head in conjunction with knowing the location of each radio head, the interface gateway can determine appropriate power levels without necessarily using additional sensor components. Additional measures to prevent interference with the macro-network include the use of beam forming with multiple antenna arrays for the radio heads. The radio head antenna pattern can be formed to have its main lobe directed towards the inside of the building, away from the external macro-network area.

As an alternative to discrete sensors 1104, the radio heads 102 themselves can serve the function of determining whether transmit power will interfere with the macro-network. In this embodiment of the invention, the power management signal would need to be transmitted on a different frequency from other radio access communication in order to avoid mutual interference with the transmit signals of the receiver radio heads. In this embodiment of the invention, an out-of-band carrier frequency, such as one belonging to the ISM band, can be used. A radio head transmits a signal with a unique phase-shift analogous to a "chirp" in radar communication or has another identifying feature. The power level of the ISM band signal can be configured so that it would not interfere with other devices operating in the band. The radio head can be designed such that the power levels of the various licensed spectrum transmissions are proportional to the out-of-band signal power level by an appropriate ratio. This ratio can differ for each communication standard depending on the standard's requirements. By adjusting the out of band signal when a high power level indicates that power is escaping the building, the licensed spectrum transmission will also be adjusted to an appropriate level. The unique chirp signal for each radio head can also be used to measure a time of flight of a reflected signal to determine the direction and distance of the closest wall in a structure. Since power sent through walls is attenuated, a radio head with directional capability can be configured so that the majority of its power radiates away from the wall and provides more service area. Assigning a unique identifier to a particular radio head can be managed by the interface gateway to ensure that the identifiers are in fact unique. This type of power management scheme would not be realistic in a system of femtocells because of a lack of integration and management of the individual cells. Performing a similar task for all femtocells on a macro-network such that nearby femtocells do not mutually interfere with this or a similar type of scheme requires more information about femtocell location than mobile networks currently have or could realistically manage. The manageable scale and functionality integration of a radio access network in accordance with the present invention make this type of RF power management an achievable task.

Having thus described several embodiments of a multi-standard indoor mobile radio access network, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. An indoor mobile radio network, comprising:
a centralized device in communication with at least one service provider; and
a plurality of radio heads, each one of said plurality of radio heads being in communication with said centralized device and configured to:
communicate with at least one wireless device;
receive a communication from said at least one of said wireless device;
generate at least one packet, said at least one packet including data that can be used to determine a z-axis location of a corresponding one of said plurality of radio heads; and
transmit said communication and said at least one packet to said centralized device, said communication and said at least one packet being transmitted separately from said corresponding one of said plurality of radio heads;
wherein said centralized device is configured to:
determine whether said wireless device is one of inside and outside a building;
transmit a wake-up command to said at least one wireless device when it is determined that said wireless device is inside said building, said wake-up command configured to activate software on said at least one wireless device;
receive a notification from said at least one of said wireless device, wherein said notification is generated by said software when said application determines that said communication is directed toward an emergency service provider;
identify one of said plurality of radio heads in communication with said wireless device at a time that said notification is received from said at least one wireless device;
transmit at least a portion of said communication to said service provider; and
transmit at least z-axis location information of said one of said plurality of radio heads, as identified, to said service provider, said z-axis location information being (i) derived from said at least one packet generated by said one of said plurality of radio heads that is in communication with said at least one wireless device at said time that said notification is received by said centralized device, (ii) transmitted together with information that identifies said at least one wireless device, and (iii) transmitted separately from said at least a portion of said communication.

2. The indoor mobile radio network of claim 1, wherein said communication is a 911 telephone call.

3. The indoor mobile radio network of claim 1, wherein said data comprises said z-axis location information.

4. The indoor mobile radio network of claim 1, wherein said data comprises an identifier of said one of said plurality of radio heads, said identifier being linked to said z-axis location information.

5. The indoor mobile radio network of claim 1, wherein said centralized device is further configured to receive said notification via said one of said plurality of radio heads.

6. The indoor mobile radio network of claim 5, wherein said one of said plurality of radio heads informs said centralized device of its location prior to transmitting said communication to said centralized device.

7. The indoor mobile radio network of claim 5, wherein said centralized device is further configured to periodically transmit a ping to said at least one wireless device when said at least one wireless device is determined to be inside said building, said ping informing said application to remain active.

8. The indoor mobile radio network of claim 1, wherein said software comprises an application and said wake-up command is further configured to download said application on said at least one wireless device.

9. The indoor mobile radio network of claim 1, wherein said step of transmitting at least z-axis location information to said service provider further comprises transmitting x-axis, y-axis and z-axis location information to said service provider.

10. The indoor mobile radio network of claim 9, wherein said x-axis and y-axis location information is derived from a plurality of power level associated with said at least one wireless device, as received by said plurality of radio heads.

11. The indoor mobile radio network of claim 1, wherein said step of transmitting at least z-axis location information to said service provider is performed after said step of transmitting at least a portion of said communication to said service provider.

12. The indoor mobile radio network of claim 1, wherein said step of transmitting at least said z-axis location information to said service provider is performed at the same time as said step of transmitting at least a portion of said communication to said service provider.

13. The indoor mobile radio network of claim 1, wherein said step of transmitting at least said z-axis location information to said service provider further comprises transmitting said z-axis location information to said service provider over at least one service provider radio access network.

14. The indoor mobile radio network of claim 1, wherein said step of transmitting at least said z-axis location information to said service provider further comprises transmitting said z-axis location information to said service provider via the Internet.

15. A method for providing location information associated with a wireless device to a service provider, comprising:
    determining whether said wireless device is one of inside and outside an enclosure;
    transmitting by a plurality of radio heads within said enclosure data to a centralized device, said data informing said centralized device of at least z-axis locations of said plurality of radio heads;
    transmitting a wake-up command to said wireless device when said wireless device is determined to be inside said enclosure, said wake-up command being configured to activate software on said wireless device;
    determining by said software when a communication from said wireless device is directed toward an emergency service provider;
    receiving by said centralized device a notification from said wireless device when said software determines that said communication is directed toward said emergency service provider;
    identifying one of said plurality of radio heads in communication with said wireless device at a time that said notification is received from said wireless device;
    transmitting by said centralized device at least a portion of said communication to said service provider, said centralized device receiving said communication from said wireless device via said one of said plurality of radio heads; and
    transmitting by said centralized device at least a z-axis location of said one of said plurality of radio heads to said service provider, said z-axis location of said one of said plurality of radio heads being (i) derived from said data transmitted by said one of said plurality of radio heads, (ii) transmitted together with a unique identifier for said wireless device, and (iii) transmitted separately from said at least a portion of said communication, said unique identifier also being transmitted together with said at least a portion of said communication.

16. The method of claim 15, wherein said communication from said wireless device comprises a 911 telephone call.

17. The method of claim 15, wherein said data from said one of said plurality of radio heads comprises said z-axis location.

18. The method of claim 15, wherein said data from said one of said plurality of radio heads comprises an identifier of said one of said plurality of radio heads, said identifier being linked to said z-axis location.

19. The method of claim 15, wherein said step of receiving by said centralized device a notification from said wireless device further comprising receiving said notification via said one of said plurality of radio heads.

20. The method of claim 19, wherein said one of said plurality of radio heads informs said centralized device of its location prior to transmitting said communication to said centralized device.

21. The method of claim 19, further comprising the step of periodically transmitting a ping to said wireless device when it is determined that said wireless device is determined to be inside said enclosure, said ping instructing said application to remain at least active.

22. The method of claim 15, wherein said software comprises an application, and said wake-up command is further used to download said application on said wireless device.

23. The method of claim 22, further comprising the step of periodically transmitting a ping to said wireless device when it is determined that said wireless device is determined to be inside said enclosure, said ping instructing said application to remain at least active.

24. The method of claim 15, wherein said step of transmitting by said centralized device at least a z-axis location to said service provider further comprises transmitting x-axis and y-axis locations of said wireless device to said service provider.

25. The method of claim 24, wherein said x-axis and y-axis location information is derived from a plurality of travel times associated with signals received from said wireless device.

26. The method of claim 15, wherein said step of transmitting by said centralized device at least a z-axis location to said service provider is performed after said step of transmitting by said centralized device at least a portion of said communication to said service provider.

27. The method of claim 15, wherein said step of transmitting by said centralized device at least a z-axis location to said service provider is performed at the same time as said step of transmitting by said centralized device at least a portion of said communication to said service provider.

28. The method of claim 15, wherein said steps of transmitting by said centralized device at least a portion of said communication and a z-axis location to said service provider further comprises transmitting said information over a service provider radio access network.

29. The method of claim 15, wherein said steps of transmitting by said centralized device at least a portion of said communication and a z-axis location to said service provider further comprises transmitting said information over the Internet.

30. A mobile radio network for a building, comprising:
a centralized device located within said building; and
a plurality of radio heads located within said building, each one of said plurality of radio heads being in communication with said centralized device and configured to:
  communicate with at least one wireless device;
  receive a communication from said at least one wireless device;
  generate at least one packet, said at least one packet including data that informs said centralized device of a z-axis location of a corresponding one of said plurality of radio heads; and
  transmit said communication and said at least one packet to said centralized device, said communication and said at least one packet being transmitted separately from said corresponding one of said plurality of radio heads;
wherein said centralized device is configured to:
  communicate periodically with software operating on said at least one wireless device when said wireless device is determined to be inside said building;
  receive a notification from said at least one wireless device when said software operating on said wireless device determines that said communication is directed toward an emergency service provider;
  identify one of said plurality of radio heads in communication with said wireless device at a time that said notification is received from said at least one wireless device;
  transmit at least a portion of said communication to said service provider; and
  transmit at least z-axis location information of said one of said plurality of radio heads, as identified, to said service provider in response to said notification, said z-axis location information being (i) derived from said at least one packet generated by said one of said plurality of radio heads that is in communication with said at least one wireless device at said time that said notification is received by said centralized device, (ii) transmitted separately from said at least a portion of said communication, and (iii) transmitted together with information that allows said z-axis location to be associated with said at least a portion of said communication.

* * * * *